United States Patent
Suzuki et al.

(10) Patent No.: US 10,611,213 B2
(45) Date of Patent: Apr. 7, 2020

(54) VEHICULAR AIR-CONDITIONING DEVICE HAVING A DEHUMIDIFYING AND HEATING MODE

(71) Applicant: Sanden Holdings Corporation, Isesaki-shi, Gunma (JP)

(72) Inventors: Kenichi Suzuki, Isesaki (JP); Ryo Miyakoshi, Isesaki (JP); Kouhei Yamashita, Isesaki (JP); Hidenori Takei, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 282 days.

(21) Appl. No.: 15/313,458

(22) PCT Filed: Mar. 16, 2015

(86) PCT No.: PCT/JP2015/057723
§ 371 (c)(1),
(2) Date: Nov. 22, 2016

(87) PCT Pub. No.: WO2015/182219
PCT Pub. Date: Dec. 3, 2015

(65) Prior Publication Data
US 2017/0210202 A1 Jul. 27, 2017

(30) Foreign Application Priority Data
May 26, 2014 (JP) ................. 2014-108306

(51) Int. Cl.
| *B60H 1/00* | (2006.01) |
| *B60H 1/32* | (2006.01) |
| *B60H 3/02* | (2006.01) |
| *F25B 49/02* | (2006.01) |
| *F25B 6/04* | (2006.01) |
| *F25B 5/04* | (2006.01) |

(Continued)

(52) U.S. Cl.
CPC ..... *B60H 1/00921* (2013.01); *B60H 1/00842* (2013.01); *B60H 1/3207* (2013.01);
(Continued)

(58) Field of Classification Search
CPC ........ B60H 1/00921; B60H 2001/3272; B60H 2001/3285; B60H 2001/006; F25B 49/02; F25B 2400/0411; F25B 2600/2501
See application file for complete search history.

(56) References Cited

U.S. PATENT DOCUMENTS

| 5,483,805 A * | 1/1996 | Fujii ................. B60H 1/00392 62/158 |
| 9,803,904 B2 * | 10/2017 | Sasaki .................. F25B 49/022 |

(Continued)

FOREIGN PATENT DOCUMENTS

| CN | 1968734 A | 5/2007 |
| CN | 100548444 C | 10/2009 |

(Continued)

OTHER PUBLICATIONS

Direct Acting Solenoid Valves Pilot Operated Solenoid Valves.*
(Continued)

*Primary Examiner* — Nelson J Nieves
(74) *Attorney, Agent, or Firm* — Baker Botts L.L.P.

(57) ABSTRACT

There is disclosed a vehicular air-conditioning device of a so-called heat pump system which eliminates or decreases noise generated when an opening/closing valve opens at a changing time of an operation mode. The vehicular air-conditioning device executes a heating mode to let a refrigerant discharged from a compressor 2 radiate heat in a radiator 4, decompress the refrigerant by which heat has been radiated, and then let the refrigerant absorb heat in an outdoor heat exchanger 7, and a dehumidifying and heating mode to open a solenoid valve 22 in a state of the heating (Continued)

mode, decompress at least a part of the refrigerant flowing out from the radiator and then let the refrigerant absorb heat in a heat absorber 9. When the heating mode changes to the dehumidifying and heating mode, the controller decreases a radiator pressure or a pressure difference before and after the solenoid valve to a predetermined value or less, and then opens the solenoid valve 22.

18 Claims, 25 Drawing Sheets

(51) Int. Cl.
  *F25B 40/00* (2006.01)
  *F25B 40/02* (2006.01)
(52) U.S. Cl.
  CPC .............. *B60H 3/024* (2013.01); *F25B 5/04*
    (2013.01); *F25B 6/04* (2013.01); *F25B 49/02*
    (2013.01); *B60H 2001/006* (2013.01); *B60H*
      *2001/00957* (2013.01); *B60H 2001/3272*
    (2013.01); *B60H 2001/3277* (2013.01); *B60H*
      *2001/3282* (2013.01); *B60H 2001/3285*
    (2013.01); *F25B 40/00* (2013.01); *F25B 40/02*
    (2013.01); *F25B 2400/0403* (2013.01); *F25B*
      *2400/0409* (2013.01); *F25B 2400/0411*
    (2013.01); *F25B 2400/0417* (2013.01); *F25B*
      *2600/2501* (2013.01)

(56) References Cited

U.S. PATENT DOCUMENTS

2007/0151270 A1* 7/2007 Matsunaga ........ B60H 1/00885
                                                                62/216
2011/0146320 A1* 6/2011 Tomiyama ........... B60H 1/3208
                                                                62/296
2012/0291467 A1* 11/2012 Sasaki ................. B60H 1/3208
                                                                62/151
2015/0260439 A1* 9/2015 Ohta ......................... F25B 5/00
                                                                62/196.1

FOREIGN PATENT DOCUMENTS

| CN | 103303097 A | 9/2013 | |
|---|---|---|---|
| CN | 103786547 A | 5/2014 | |
| EP | 2727754 A1 * | 5/2014 | ......... B60H 1/00899 |
| JP | 7-164868 A | 6/1995 | |
| JP | 2003-279180 A | 10/2003 | |
| JP | 2006-69332 A | 3/2006 | |
| JP | 3985384 B2 | 10/2007 | |
| JP | 2013-180743 A | 9/2013 | |
| JP | 2013-193610 A | 9/2013 | |
| JP | 2013-256230 A | 12/2013 | |
| JP | 2014-88151 A | 5/2014 | |
| JP | 2014-88154 A | 5/2014 | |
| WO | 2005123225 A1 | 12/2005 | |

OTHER PUBLICATIONS

Solenoid valve type differences—Tamesoncom.*
Japan Patent Office, Notification of Reasons for Refusal issued in Japanese Application No. 2014-108306, dated Dec. 26, 2017.
Japan Patent Office, International Search Report for PCT/JP2015/057723, dated Jun. 16, 2015.
Japan Patent Office, Notification of Reasons for Refusal issued in Japanese Patent Application No. 2014-108306, dated Jun. 5, 2018.
State Intellectual Property Office of the People's Republic of China, First Examination Opinion Notice (PCT application entering national stage), issued in Chinese Application No. CN 201580026852.0, dated Apr. 26, 2018.

* cited by examiner

VEHICULAR AIR-CONDITIONING DEVICE HAVING A DEHUMIDIFYING AND HEATING MODE

CROSS-REFERENCE TO RELATED APPLICATIONS

This application is a U.S. National Stage Patent Application under 37 U.S.C. § 371 of International Patent Application No. PCT/JP2015/057723, filed on Mar. 16, 2015, which claims the benefit of Japanese Patent Application No. JP 2014-108306, filed on May 26, 2014, the disclosures of each of which are incorporated herein by reference in their entirety.

TECHNICAL FIELD

The present invention relates to a vehicular air-conditioning device of a heat pump system which conditions air in a vehicle interior, and more particularly, it relates to a vehicular air-conditioning device which is suitable for a hybrid car or an electric car.

BACKGROUND ART

Due to actualization of environmental problems in recent years, hybrid cars and electric cars have spread. Further, as an air-conditioning device which is applicable to such a vehicle, there has been developed an air-conditioning device which includes a compressor to compress and discharge a refrigerant, a radiator (a condenser) disposed in a vehicle interior to let the refrigerant radiate heat, a heat absorber (an evaporator) disposed in the vehicle interior to let the refrigerant absorb heat, and an outdoor heat exchanger disposed outside the vehicle interior to let the refrigerant radiate or absorb heat, and which changes and executes respective modes of a heating mode to let the refrigerant discharged from the compressor radiate heat in the radiator and let the refrigerant by which heat has been radiated in this radiator absorb heat in the outdoor heat exchanger, a dehumidifying and heating mode to let the refrigerant discharged from the compressor radiate heat in the radiator and let the refrigerant by which heat has been radiated in the radiator absorb heat in the heat absorber, and a cooling mode to let the refrigerant discharged from the compressor radiate heat in the outdoor heat exchanger and let the refrigerant absorb heat in the heat absorber (e.g., see Patent Document 1).

CITATION LIST

Patent Documents

Patent Document 1: Publication of Japanese Patent No. 3985384

SUMMARY OF THE INVENTION

Problems to be Solved by the Invention

Here, a solenoid valve for dehumidifying (an opening/closing valve) is disposed in parallel with an outdoor heat exchanger, and when the above heating mode changes to a dehumidifying and heating mode, the above solenoid valve for dehumidifying opens in a state of the heating mode, and a refrigerant flowing out from a radiator is decompressed to flow into a heat absorber, but a pressure difference before and after the solenoid valve during this changing is remarkably large, and hence comparatively large noise is generated by the refrigerant rapidly flowing into the heat absorber at an opening time of the solenoid valve.

Furthermore, an outdoor expansion valve to decompress the refrigerant flowing into the outdoor heat exchanger is disposed before the outdoor heat exchanger, and furthermore, a solenoid valve for bypass (an opening/closing valve) is disposed in parallel with this outdoor expansion valve, and when the above heating mode or the dehumidifying and heating mode changes to a cooling mode, this solenoid valve for bypass opens, but a pressure difference before and after the solenoid valve during this changing is remarkably large, and hence there has been the problem that large noise is similarly generated by the refrigerant rapidly flowing into the outdoor heat exchanger at the opening time of the solenoid valve.

The present invention has been developed to solve such a conventional technical problem, and an object thereof is to eliminate or decrease noise generated in a case where an opening/closing valve opens at a changing time of an operation mode in a vehicular air-conditioning device of a so-called heat pump system.

Means for Solving the Problems

A vehicular air-conditioning device of the invention of claim 1 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an opening/closing valve for dehumidifying which is connected in parallel with this outdoor heat exchanger, and control means, the vehicular air-conditioning device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and a dehumidifying and heating mode in which the control means opens the opening/closing valve in a state of this heating mode, decompresses at least a part of the refrigerant flowing out from the radiator and then lets the refrigerant absorb heat in the heat absorber, and the vehicular air-conditioning device is characterized in that when the heating mode changes to the dehumidifying and heating mode, the control means executes noise improvement control to decrease a pressure of the radiator or a pressure difference before and after the opening/closing valve to a predetermined value or less and then to open the opening/closing valve.

A vehicular air-conditioning device of the invention of claim 2 includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an outdoor expansion valve to decompress the refrigerant flowing into this outdoor heat exchanger, an opening/closing valve for bypass which is connected in parallel with this outdoor expansion valve, and control means, the vehicular air-conditioning device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying and heating mode in which the control means decompresses at least a part of the refrigerant flowing out from the radiator in a state of this heating mode, and then lets the refrigerant absorb heat in the heat absorber, and a cooling mode in which the control means opens the opening/closing valve, lets the refrigerant discharged from the compressor radiate heat in the outdoor heat exchanger, decompresses the refrigerant by which heat has been radiated, and then lets the refrigerant absorb heat in the heat absorber, and the vehicular air-conditioning device is characterized in that when the heating mode or the dehumidifying and heating mode changes to the cooling mode, the control means executes noise improvement control to decrease a pressure of the radiator or a pressure difference before and after the opening/closing valve to a predetermined value or less and then to open the opening/closing valve.

The vehicular air-conditioning device of the invention of claim 3 is characterized in that in the above respective inventions, the control means decreases a number of revolution of the compressor in the noise improvement control.

The vehicular air-conditioning device of the invention of claim 4 is characterized in that the above invention includes an outdoor expansion valve to decompress the refrigerant flowing into the outdoor heat exchanger, and the control means enlarges a valve position of the outdoor expansion valve in the noise improvement control.

The vehicular air-conditioning device of the invention of claim 5 is characterized in that the invention of claim 1 includes an outdoor expansion valve to decompress the refrigerant flowing into the outdoor heat exchanger, and in the noise improvement control, the control means decreases a number of revolution of the compressor, also controls a valve position of the outdoor expansion valve so that a subcool degree of the refrigerant of the radiator becomes a predetermined value or less, and opens the opening/closing valve after the pressure of the radiator, the pressure difference before and after the opening/closing valve or the subcool degree decreases to the predetermined value or less.

The vehicular air-conditioning device of the invention of claim 6 is characterized in that the invention of claim 1 includes an outdoor expansion valve to decompress the refrigerant flowing into the outdoor heat exchanger, and an opening/closing valve for bypass which is connected in parallel with this outdoor expansion valve, and in the noise improvement control, the control means decreases a number of revolution of the compressor, enlarges a valve position of the outdoor expansion valve and then opens the opening/closing valve for bypass, and opens the opening/closing valve for dehumidifying after the pressure of the radiator or the pressure difference before and after the opening/closing valve for dehumidifying decreases to the predetermined value or less.

The vehicular air-conditioning device of the invention of claim 7 is characterized in that in the invention of claim 2, the opening/closing valve is a solenoid valve which opens in a non-energized state, and in a case of stopping from the heating mode, the dehumidifying and heating mode or a defrosting mode to defrost the outdoor heat exchanger, the control means enlarges a valve position of the outdoor expansion valve or closes the opening/closing valve until the pressure of the radiator decreases to the predetermined value or less or until predetermined time elapses from stop of the compressor.

The vehicular air-conditioning device of the invention of claim 8 is characterized in that the invention of claim 2 or the above invention includes an indoor blower to supply the air to the air flow passage, and an outdoor blower to blow outdoor air through the outdoor heat exchanger, and the control means increases an air volume of the indoor blower and/or the outdoor blower immediately before opening the opening/closing valve.

The vehicular air-conditioning device of claim 9 is characterized in that in the above respective inventions, as a velocity is higher, the control means increases the predetermined value of the pressure of the radiator, the predetermined value of the pressure difference before and after the opening/closing valve, or the predetermined value of the subcool degree of the refrigerant of the radiator.

The vehicular air-conditioning device of the invention of claim 10 is characterized in that in the above respective inventions, the control means stops the compressor in the noise improvement control.

The vehicular air-conditioning device of the invention of claim 11 is characterized in that the above respective inventions include an indoor blower to supply the air to the air flow passage, and as an air volume of the indoor blower decreases, the control means decreases the predetermined value of the pressure of the radiator, the predetermined value of the pressure difference before and after the opening/closing valve, or the predetermined value of the subcool degree of the refrigerant of the radiator.

The vehicular air-conditioning device of the invention of claim 12 is characterized in that the above respective inventions include an indoor blower to supply the air to the air flow passage, and the control means does not execute the noise improvement control in a case where a velocity is a predetermined value or more and/or in a case where an air volume of the indoor blower is a predetermined value or more.

Advantageous Effect of the Invention

According to the invention of claim 1, a vehicular air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an opening/closing valve for dehumidifying which is connected in parallel with this outdoor heat exchanger, and control means, the vehicular air-conditioning device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and a dehumidifying and heating mode in which the control means opens the opening/closing valve in a state of this heating mode, decompresses at least a part of the refrigerant flowing out from the radiator and then lets the refrigerant absorb heat in the heat absorber, and in the vehicular air-conditioning device, when the heating mode changes to the dehumidifying and heating mode, the control means executes noise improvement control to decrease a pressure of the radiator or a pressure difference before and after the opening/closing valve to a predetermined value or less and then to open the opening/closing valve. Therefore, when the heating mode changes to the dehumidifying and heating mode, it is possible to noticeably inhibit or eliminate the refrigerant rapidly flowing into the heat absorber when the opening/closing valve for dehumidifying opens.

In consequence, at the time of changing from the heating mode to the dehumidifying and heating mode, it is possible to eliminate or decrease noise generated when the opening/closing valve for dehumidifying opens.

Furthermore, according to the invention of claim 2, a vehicular air-conditioning device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an outdoor expansion valve to decompress the refrigerant flowing into this outdoor heat exchanger, an opening/closing valve for bypass which is connected in parallel with this outdoor expansion valve, and control means, the vehicular air-conditioning device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, a dehumidifying and heating mode in which the control means decompresses at least a part of the refrigerant flowing out from the radiator in a state of this heating mode, and then lets the refrigerant absorb heat in the heat absorber, and a cooling mode in which the control means opens the opening/closing valve, lets the refrigerant discharged from the compressor radiate heat in the outdoor heat exchanger, decompresses the refrigerant by which heat has been radiated, and then lets the refrigerant absorb heat in the heat absorber, and in the vehicular air-conditioning device, when the heating mode or the dehumidifying and heating mode changes to the cooling mode, the control means executes noise improvement control to decrease a pressure of the radiator or a pressure difference before and after the opening/closing valve to a predetermined value or less and then to open the opening/closing valve. Therefore, when the heating mode or the dehumidifying and heating mode changes to the cooling mode, it is possible to noticeably inhibit or eliminate the refrigerant rapidly flowing into the outdoor heat exchanger when the opening/closing valve for bypass opens.

In consequence, at the changing time from the heating mode or the dehumidifying and heating mode to the cooling mode, it is possible to eliminate or decrease noise generated when the opening/closing valve for bypass opens.

In these cases, when the control means decreases a number of revolution of the compressor in the noise improvement control as in the invention of claim 3, it is possible to effectively decrease a pressure of the radiator or a pressure difference before and after the opening/closing valve in the noise improvement control.

In addition, when the control means enlarges a valve position of the outdoor expansion valve to decompress the refrigerant flowing into the outdoor heat exchanger in the noise improvement control as in the invention of claim 4, it is possible to more rapidly decrease a pressure of the radiator or a pressure difference before and after the opening/closing valve.

Furthermore, as in the invention of claim 5 in addition to the invention of claim 1, in the noise improvement control, the control means may decrease a number of revolution of the compressor, may also control a valve position of the outdoor expansion valve to decompress the refrigerant flowing into the outdoor heat exchanger so that a subcool degree of the refrigerant of the radiator becomes a predetermined value or less, and may open the opening/closing valve after the pressure of the radiator, the pressure difference before and after the opening/closing valve or the subcool degree decreases to the predetermined value or less. The subcool degree of the radiator decreases, thereby decreasing a density of the refrigerant, and hence it is possible to more effectively achieve elimination or decrease of noise.

Furthermore, as in the invention of claim 6, when the invention of claim 1 additionally includes an opening/closing valve for bypass which is connected in parallel with an outdoor expansion valve to decompress the refrigerant flowing into the outdoor heat exchanger, in the noise improvement control, the control means may decrease a number of revolution of the compressor, enlarge a valve position of the outdoor expansion valve and then open the opening/closing valve for bypass, and open the opening/closing valve for dehumidifying after the pressure of the radiator or the pressure difference before and after the opening/closing valve for dehumidifying decreases to the predetermined value or less. In this case, it is possible to further rapidly decrease the pressure of the radiator or the pressure difference before and after the opening/closing valve for dehumidifying, by the opening/closing valve for bypass.

Furthermore, in a case where the opening/closing valve for bypass is a solenoid valve which opens in a non-energized state as in the invention of claim 7, in addition to the invention of claim 2, in a case of stopping from the heating mode, the dehumidifying and heating mode or a defrosting mode to defrost the outdoor heat exchanger, the control means enlarges a valve position of the outdoor expansion valve or closes the opening/closing valve until the pressure of the radiator decreases to the predetermined value or less or predetermined time elapses from stop of the compressor. Consequently, it is possible to eliminate or inhibit noise generated when the opening/closing valve for bypass opens during the stop.

Furthermore, as in the invention of claim 8, the control means may increase an air volume of an indoor blower to supply the air to the air flow passage and/or an outdoor blower to blow outdoor air through the outdoor heat exchanger, immediately before opening the opening/closing valve. When the air volume of the indoor blower increases, the pressure of the radiator decreases. Furthermore, when the air volume of the outdoor blower increases, the pressure of the outdoor heat exchanger increases, and hence in any case, it is possible to effectively decrease the pressure of the radiator or the pressure difference before and after the opening/closing valve.

Furthermore, as in the invention of claim 9, as a velocity is higher, the control means may increase the predetermined value of the pressure of the radiator, the predetermined value of the pressure difference before and after the opening/closing valve, or the predetermined value of the subcool degree of the refrigerant of the radiator. As the velocity is higher, an amount of the outdoor air flowing into the outdoor heat exchanger increases, and a pressure thereof increases.

Therefore, even when the predetermined value of the pressure of the radiator, the predetermined value of the pressure difference before and after the opening/closing valve or the predetermined value of the subcool degree of the refrigerant of the radiator increases, it is possible to eliminate or decrease noise. Consequently, it is possible to open the opening/closing valve earlier and rapidly change the operation mode.

Furthermore, when the control means stops the compressor in the noise improvement control as in the invention of claim 10, it is possible to further rapidly decrease the pressure of the radiator or the pressure difference before and after the opening/closing valve.

Furthermore, as in the invention of claim 11, as an air volume of an indoor blower to supply the air to the air flow passage decreases, the control means decreases the predetermined value of the pressure of the radiator, the predetermined value of the pressure difference before and after the opening/closing valve, or the predetermined value of the subcool degree of the refrigerant of the radiator. In this case, in a situation where the air volume of the indoor blower decreases and the pressure of the radiator increases, it is possible to more securely eliminate or decrease generation of noise.

Further, as in the invention of claim 12, the control means does not execute the noise improvement control in a case where a velocity is a predetermined value or more and/or in a case where an air volume of an indoor blower to supply the air to the air flow passage is a predetermined value or more. In this case, in a situation where an amount of the outdoor air flowing into the outdoor heat exchanger increases and a pressure thereof increases and/or in a situation where the air volume of the indoor blower is large and the pressure of the radiator does not increase, the control means does not execute the noise improvement control, and immediately opens the opening/closing valve, thereby making it possible to avoid both of generation of noise and delay of the operation mode changing.

MODE FOR CARRYING OUT THE INVENTION

Hereinafter, embodiments of the present invention will be described in detail with reference to the drawings.

Embodiment 1

Figure 1:
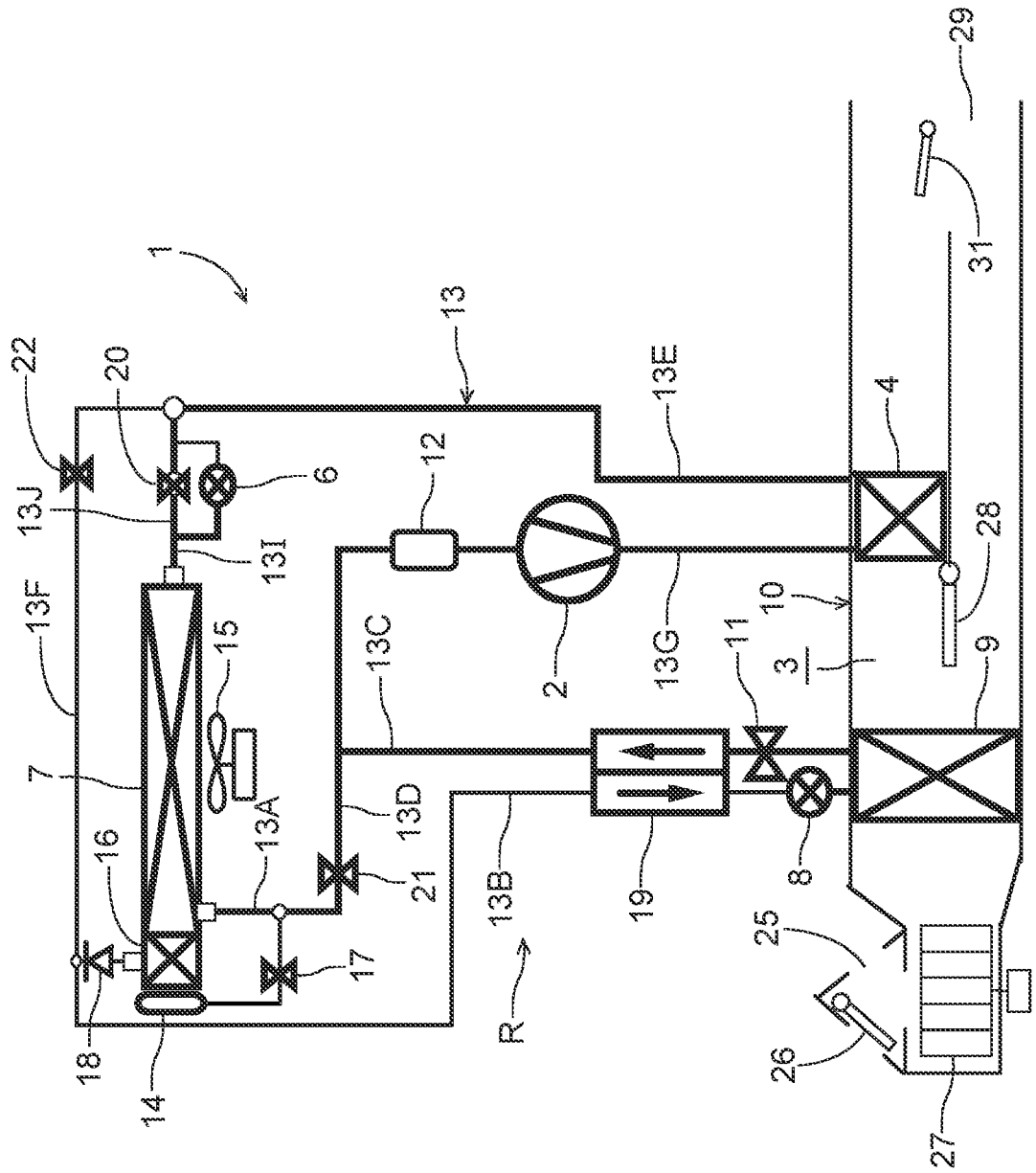
FIG. 1 is a constitutional view of a vehicular air-conditioning device of one embodiment to which the present invention is applied.

FIG. 1 shows a constitutional view of a vehicular air-conditioning device 1 of one embodiment of the present invention. A vehicle of the embodiment to which the present invention is applied is an electric car (EV) in which an engine (an internal combustion engine) is not mounted and which runs by driving an electric motor for running with power charged in a battery (which is not shown in the drawing), and the vehicular air-conditioning device 1 of the present invention is also driven with the power of the battery. That is, the vehicular air-conditioning device 1 of the embodiment performs heating by a heat pump operation using a refrigerant circuit in an electric car in which it is not possible to perform heating by engine waste heat, and further, the vehicular air-conditioning device selectively executes respective operation modes of dehumidifying and heating, cooling and dehumidifying, cooling, and the like.

It is to be noted that the vehicle is not limited to the electric car, and the present invention is also effective for a so-called hybrid car using the engine together with the electric motor for running, and furthermore, needless to say, the present invention is also applicable to a usual car which runs with the engine.

The vehicular air-conditioning device 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant, a radiator 4 disposed in an air flow passage 3 of an HVAC unit 10 in which vehicle interior air passes and circulates, to let the high-temperature high-pressure refrigerant discharged from the compressor 2 flow inside via a refrigerant pipe 13G and to let this refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, thereby constituting a refrigerant circuit R.

It is to be noted that in the outdoor heat exchanger 7, an outdoor blower 15 is disposed. The outdoor blower 15 is constituted to forcibly blow the outdoor air through the outdoor heat exchanger 7, thereby performing heat exchange between the outdoor air and the refrigerant, and consequently, the outdoor blower blows the outdoor air through the outdoor heat exchanger 7 also during stop (i.e., a velocity VSP is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve for cooling 17 of an opening/closing valve for cooling which opens during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (sub-cooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve for heating 21 of an opening/closing valve for heating which opens during the heating. Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve for dehumidifying 22 of an opening/closing valve for dehumidifying which opens during the dehumidifying. That is, the solenoid valve 22 is connected in parallel with the outdoor heat exchanger 7.

Furthermore, the outdoor expansion valve 6 is connected in parallel with a bypass pipe 13J, and in the bypass pipe 13J, a solenoid valve for bypass 20 of an opening/closing valve for bypass is interposed to open in a cooling mode so that the refrigerant bypasses the outdoor expansion valve 6 to flow. It is to be noted that a pipe between the outdoor expansion valve 6 and the solenoid valve 20 and the outdoor heat exchanger 7 is denoted with 131.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in the air flow passage 3 on the air upstream side of the radiator 4, an air mix damper 28 is disposed to adjust a degree of flow of the indoor air or the outdoor air through the radiator 4. Furthermore, in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
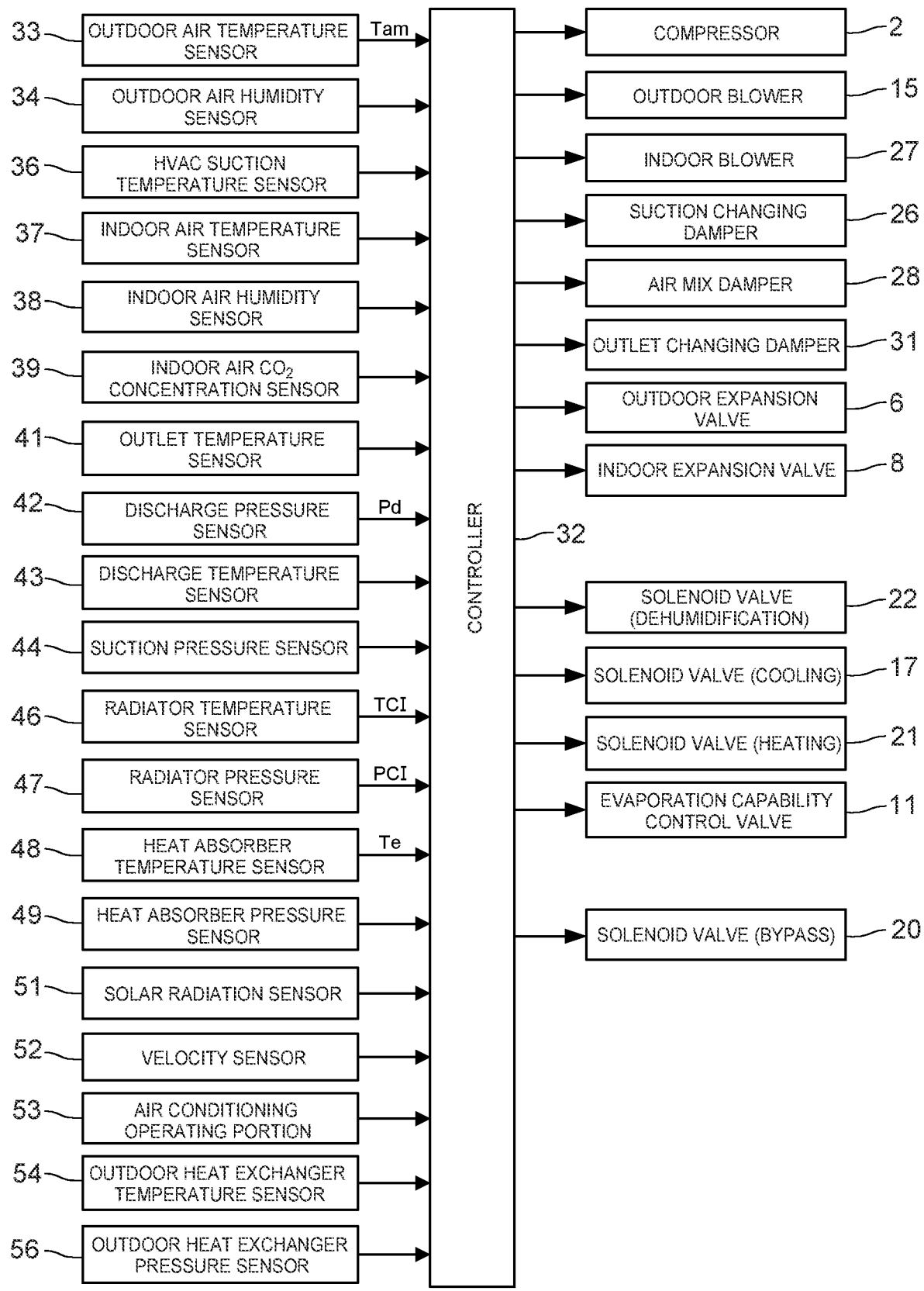
FIG. 2 is a block diagram of an electric circuit of a controller of the vehicular air-conditioning device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity of the vehicle, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air blown out from the outlet 29 to the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself), a radiator pressure sensor 47 which detects a refrigerant pressure of the radiator 4 (the pressure of the refrigerant in the radiator 4 or the refrigerant which has just flowed out from the radiator 4), a heat absorber temperature sensor 48 which detects a temperature of the heat absorber 9 (the temperature of the air passed through the heat absorber 9 or the temperature of the heat absorber 9 itself), a heat absorber pressure sensor 49 which detects a refrigerant pressure of the heat absorber 9 (the pressure of the refrigerant in the heat absorber 9 or the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (the velocity), an air conditioning operating portion 53 to set the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects a refrigerant pressure of the outdoor heat exchanger 7 (the pressure of the refrigerant in the outdoor heat exchanger 7 or the refrigerant which has just flowed out from the outdoor heat exchanger 7).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, and the evaporation capability control valve 11. Further, the controller 32 controls these components on the basis of the outputs of the respective sensors and the setting input by the air conditioning operating portion 53.

Here, the solenoid valve for cooling 17 and the solenoid valve for bypass 20 mentioned above are so-called normally open solenoid valves which open at a non-energizing time. Furthermore, the solenoid valve for heating 21 and the solenoid valve for dehumidifying 22 mentioned above are so-called normally close solenoid valves which close at the non-energizing time, whereby it is considered that also in a state where a power source is cut, the annual refrigerant circuit is constituted to communicate with a discharge side of the compressor 2, the radiator 4, the outdoor heat exchanger 7, the heat absorber 9 and a suction side of the compressor 2.

Next, an operation of the vehicular air-conditioning device 1 of the embodiment having the above-mentioned constitution will be described. In the embodiment, the controller 32 changes and executes respective roughly divided operation modes such as a heating mode, a dehumidifying and heating mode, an internal cycle mode, a dehumidifying and cooling mode, and a cooling mode. First, flow of the refrigerant in each operation mode will be described.

(1) Heating Mode

When the heating mode is selected by the controller 32 or a manual operation to the air conditioning operating portion 53, the controller 32 opens the solenoid valve 21 and closes the solenoid valve 17, the solenoid valve 22, and the solenoid valve 20. Further, the controller operates the compressor 2 and the respective blowers 15 and 27, and the air mix damper 28 has a state of passing the air blown out from the indoor blower 27 through the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump and the outdoor heat exchanger 7 functions as an evaporator of the refrigerant. Further, the low-temperature refrigerant flowing out from the outdoor heat exchanger 7 flows through the refrigerant pipe 13A and the solenoid valve 21 and the refrigerant pipe 13D, and flows from the refrigerant pipe 13C into the accumulator 12 to perform gas liquid separation therein, and then the gas refrigerant is sucked into the compressor 2, thereby repeating this circulation. The air heated in the radiator 4 is blown out from the outlet 29, thereby performing the heating of the vehicle interior.

The controller 32 controls a number of revolution Nc of the compressor 2 on the basis of a high pressure of the refrigerant circuit R which is detected by the discharge pressure sensor 42 or the radiator pressure sensor 47, also controls a valve position of the outdoor expansion valve 6 on the basis of a temperature of the radiator 4 which is detected by the radiator temperature sensor 46 and the refrigerant pressure of the radiator 4 which is detected by the radiator pressure sensor 47, and controls a subcool degree of the refrigerant in the outlet of the radiator 4.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution Nc of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48.

(3) Internal Cycle Mode

Next, in the internal cycle mode, the controller 32 shuts off the outdoor expansion valve 6 in the above state of the dehumidifying and heating mode (a shut off position), and also closes the solenoid valves 20 and 21. When the outdoor expansion valve 6 and the solenoid valves 20 and 21 close, inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution Nc of the compressor 2 on the basis of the temperature of the heat absorber 9 or the above-mentioned high pressure of the refrigerant circuit R. At this time, the controller 32 selects a smaller compressor target number of revolution from compressor target numbers of revolution obtainable by calculations from the temperature of the heat absorber 9 or the high pressure, to control the compressor 2.

(4) Dehumidifying and Cooling Mode

Next, in the dehumidifying and cooling mode, the controller 32 opens the solenoid valve 17 and closes the solenoid valve 21, the solenoid valve 22 and the solenoid valve 20. Further, the controller operates the compressor 2 and the respective blowers 15 and 27, and the air mix damper 28 has the state of passing the air blown out from the indoor blower 27 through the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution Nc of the compressor 2 on the basis of the temperature of the heat absorber 9 which is detected by the heat absorber temperature sensor 48, also controls the valve position of the outdoor expansion valve 6 on the basis of the above-mentioned high pressure of the refrigerant circuit R, and controls the refrigerant pressure of the radiator 4 (a radiator pressure PCI).

(5) Cooling Mode

Next, in the cooling mode, the controller 32 opens the solenoid valve 20 in the above state of the dehumidifying and cooling mode (in this case, the outdoor expansion valve 6 may have any valve position including full open (the valve position is an upper limit of controlling)), and the air mix damper 28 includes a state where the air does not pass through the radiator 4, and has a state of controlling a volume of the air to be passed. In consequence, the high-temperature high-pressure gas refrigerant discharged from the compressor 2 flows into the radiator 4. In a case where the air in the air flow passage 3 does not pass through the radiator 4, the refrigerant only passes the radiator, and in a case where the air passes through the radiator, the refrigerant radiates heat in the air. The refrigerant flowing out from the radiator 4 flows through the refrigerant pipe 13E to reach the solenoid valve 20 and the outdoor expansion valve 6.

At this time, the solenoid valve 20 is open, and hence the refrigerant bypasses the outdoor expansion valve 6 to pass the bypass pipe 13J, and flows as it is into the outdoor heat exchanger 7, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 or slightly passes the radiator, and is blown out from the outlet 29 to the vehicle interior, thereby performing cooling of the vehicle interior. In this cooling mode, the controller 32 controls the number of revolution Nc of the compressor 2 on the basis of the temperature of the heat absorber 9 which is detected by the heat absorber temperature sensor 48.

On startup, the controller 32 selects the operation mode on the basis of an outdoor air temperature Tam detected by the outdoor air temperature sensor 33 and a target outlet temperature TAO. Furthermore, after the startup, the controller selects and changes the above respective operation modes in accordance with changes of environments of the outdoor air temperature Tam, the target outlet temperature TAO and the like or setting conditions.

(6) Noise Improvement Control (No. 1)

Figure 3:
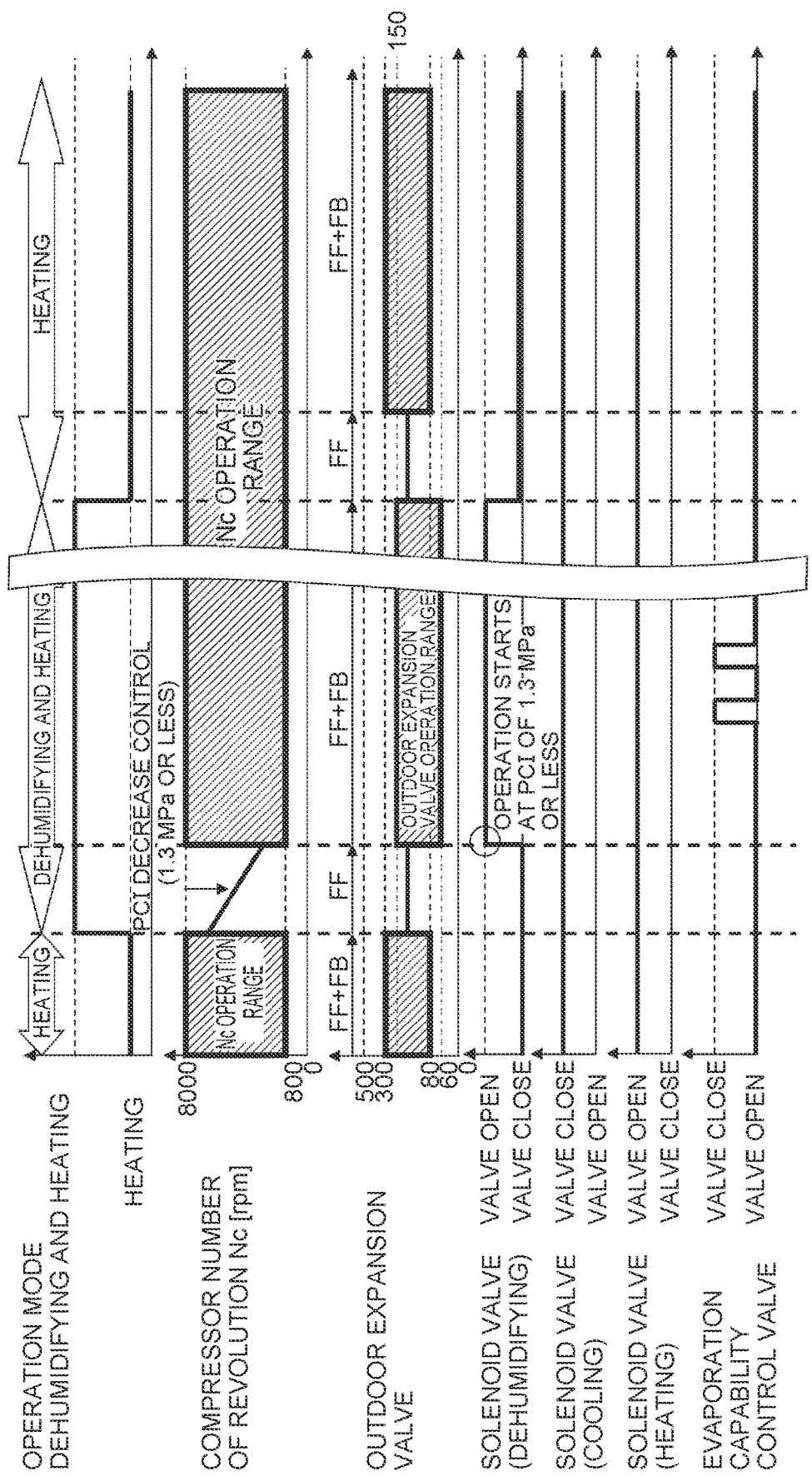
FIG. 3 is a timing chart of each apparatus explaining noise improvement control to be executed by the controller of FIG. 2 (Embodiment 1)
Figure 4:
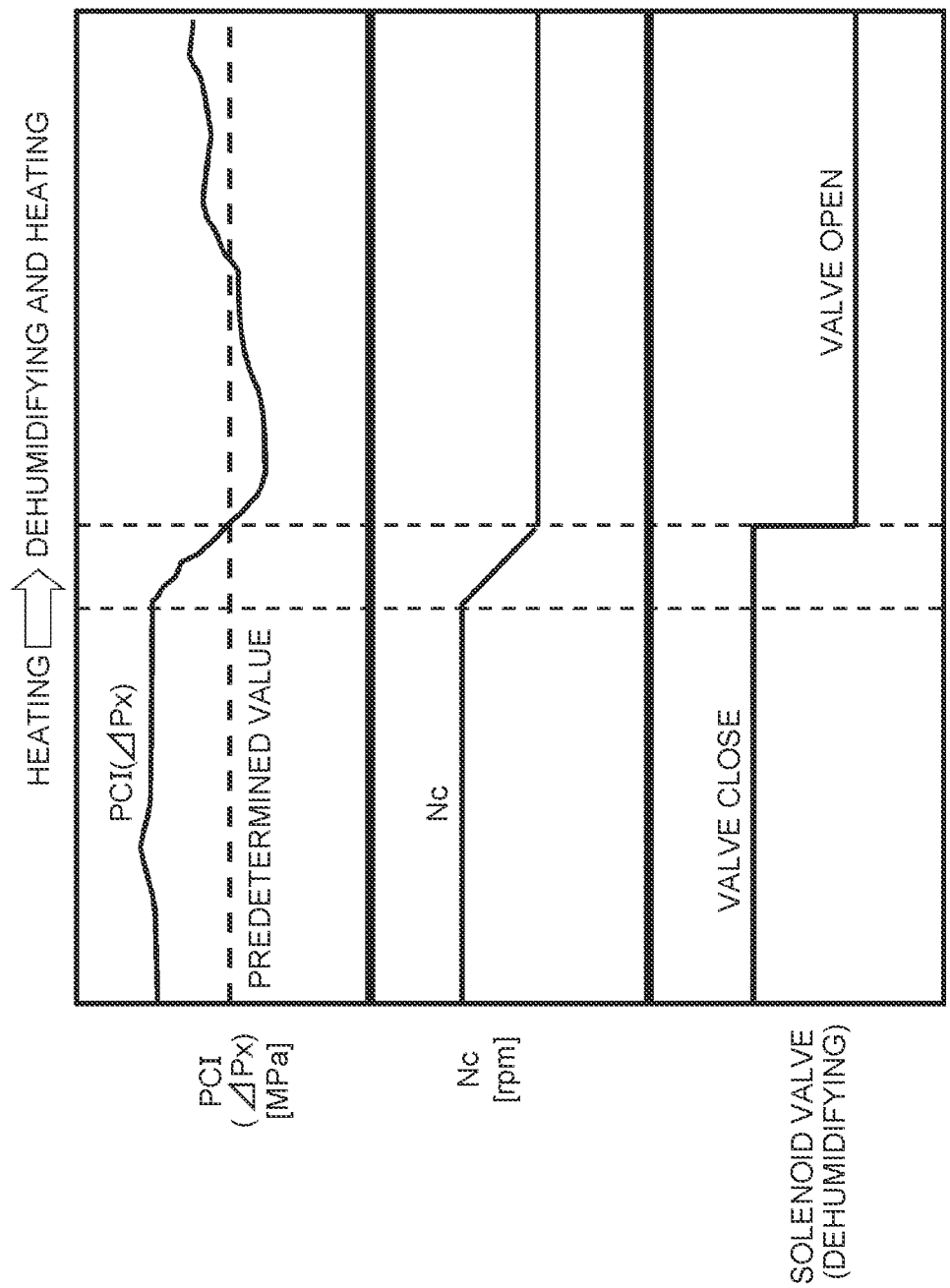
FIG. 4 is a timing chart explaining operations of a compressor and a solenoid valve for dehumidifying in FIG. 3.

Next, there will be described one example of noise improvement control to be executed by the controller 32 when the heating mode changes to the dehumidifying and heating mode, with reference to FIG. 3 and FIG. 4. As described above, in the heating mode, the solenoid valve for dehumidifying 22 is closed, but in the dehumidifying and heating mode, the solenoid valve 22 is opened. However, when the solenoid valve 22 opens, an upstream side of the solenoid valve 22 (a radiator 4 side) has the high pressure, and hence there has been the disadvantage that when the solenoid valve 22 opens, the refrigerant flows into the heat absorber 9 at once and intense noise is generated.

To eliminate such a problem, when the operation mode changes from the heating mode to the dehumidifying and heating mode in this embodiment, the controller 32 first keeps the solenoid valve for dehumidifying 22 to be closed (i.e., the operation mode is still the heating mode), and decreases the number of revolution Nc of the compressor 2 (decreases the number of revolution at a predetermined inclination angle in the embodiment). When the number of revolution Nc of the compressor 2 decreases, the pressure of the radiator 4 (the high pressure, i.e., the radiator pressure PCI) decreases as shown in FIG. 4. Consequently, a pressure difference before and after the solenoid valve 22 (a refrigerant upstream side and a downstream side) also decreases. Further, when the radiator pressure PCI detected by the radiator pressure sensor 47 becomes a predetermined value (e.g., from 0.5 to 1.3 MPa or the like) or less, the controller 32 opens the solenoid valve for dehumidifying 22. Consequently, the operation mode changes to the dehumidifying and heating mode.

After opening the solenoid valve 22, the controller 32 adjusts control of the number of revolution Nc of the compressor 2 into a proper control state in the dehumidifying and heating mode. In this way, when the operation mode changes from the heating mode to the dehumidifying and heating mode, the controller 32 executes the noise improvement control to decrease the radiator pressure PCI to the predetermined value or less and then to open the solenoid valve for dehumidifying 22, and hence when the controller opens the solenoid valve 22 in the case of changing from the heating mode to the dehumidifying and heating mode, the refrigerant does not rapidly flow into the heat absorber 9. In consequence, at the changing time from the heating mode to the dehumidifying and heating mode, it is possible to eliminate or decrease noise generated when the solenoid valve for dehumidifying 22 opens.

Furthermore, in this case, the controller 32 decreases the number of revolution Nc of the compressor 2 in the noise improvement control, and hence it is possible to effectively decrease the radiator pressure PCI and the pressure difference before and after the solenoid valve 22 in the noise improvement control.

It is to be noted that in the above embodiment, when the radiator pressure PCI decreases to the predetermined value, the solenoid valve for dehumidifying 22 opens, but in a case where there is disposed a pressure sensor which detects the refrigerant pressure on a downstream side of the solenoid valve 22, on the basis of a pressure difference ΔPx before and after the solenoid valve 22 (the radiator pressure PCI– the refrigerant pressure on the refrigerant downstream side), the controller may open the solenoid valve 22 when the pressure difference ΔPx decreases to the predetermined value or less (this also applies to the following embodiments).

(7) Noise Improvement Control (No. 2)

Figure 5:
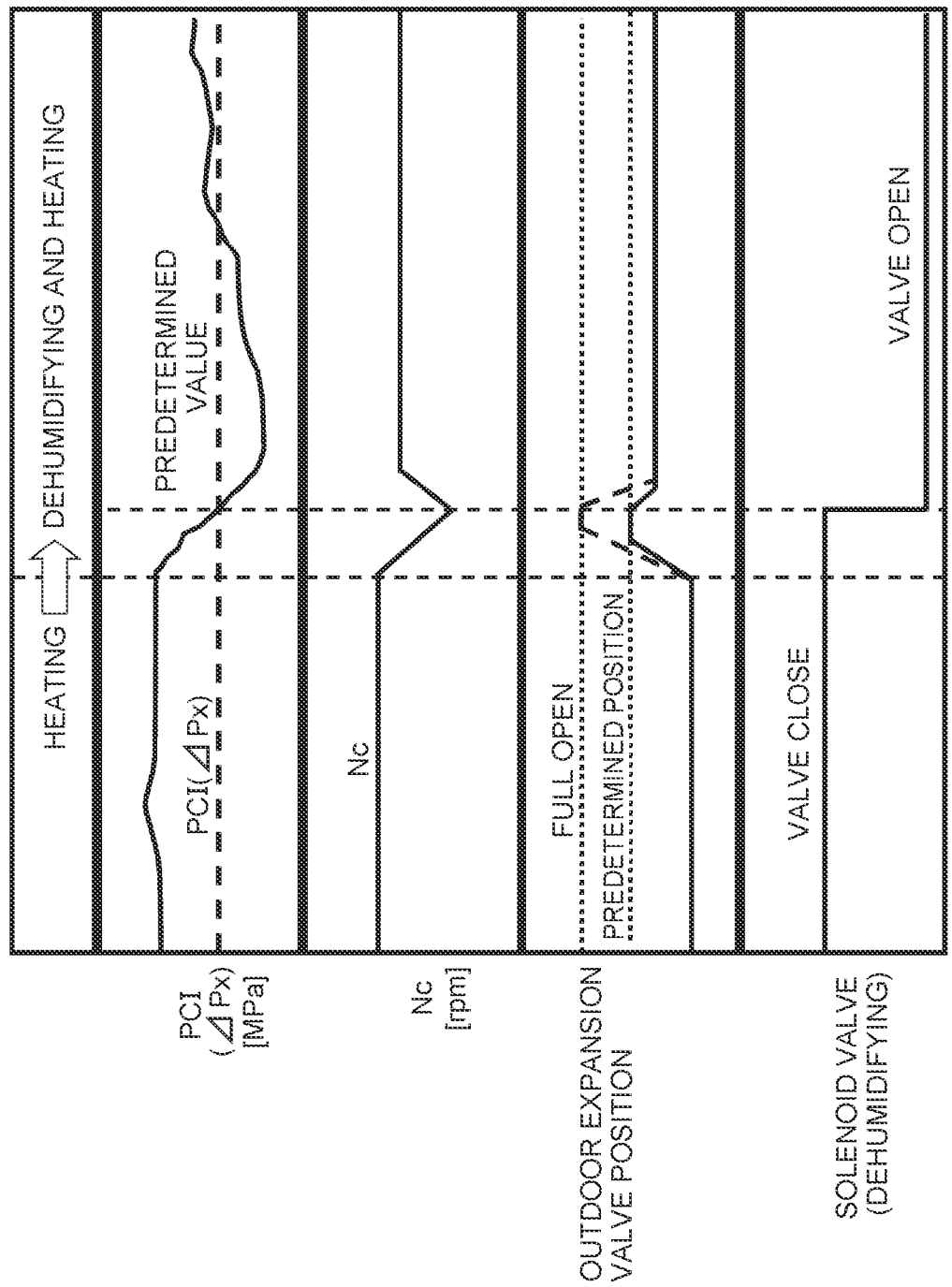
FIG. 5 is a timing chart explaining operations of the compressor, an outdoor expansion valve and the solenoid valve for dehumidifying in another noise improvement control.

Next, there will be described another example of the noise improvement control to be executed by the controller 32 when the heating mode changes to the dehumidifying and heating mode, with reference to FIG. 5. When the operation mode changes from the heating mode to the dehumidifying and heating mode, in the noise improvement control of this example, the controller 32 first keeps the solenoid valve for dehumidifying 22 to be closed (i.e., the operation mode is still the heating mode), and decreases the number of revolution Nc of the compressor 2 (decreases the number of revolution at the predetermined inclination angle in the embodiment), and fully opens the outdoor expansion valve 6 (at a position of an upper limit of controlling which is shown by a broken line in the drawing), or enlarges the valve position of the outdoor expansion valve 6 to a predetermined position (shown by a solid line in the drawing) (enlarges the valve position at the predetermined inclination angle in the embodiment).

When the number of revolution Nc of the compressor 2 decreases, the pressure of the radiator 4 (the high pressure, i.e., the radiator pressure PCI) decreases in the same manner as described above. Furthermore, the controller enlarges the valve position of the outdoor expansion valve 6, thereby also decreasing the radiator pressure PCI, and hence the radiator pressure PCI rapidly decreases as shown in FIG. 5 due to these synergistic operations. Consequently, the pressure difference before and after the solenoid valve 22 (the refrigerant upstream side and the downstream side) also rapidly decreases. Further, when the radiator pressure PCI detected by the radiator pressure sensor 47 becomes the predetermined value (e.g., from 0.5 to 1.3 MPa or the like in the same manner as described above) or less, the controller 32 opens the solenoid valve for dehumidifying 22. Consequently, the operation mode changes to the dehumidifying and heating mode.

After opening the solenoid valve 22, the controller 32 adjusts the control of the number of revolution Nc of the compressor 2 into the proper control state in the dehumidifying and heating mode. Furthermore, the controller adjusts the valve position of the outdoor expansion valve 6 into a proper control state in the dehumidifying and heating mode.

Also in this way, when the controller opens the solenoid valve 22 in the case of changing the heating mode to the dehumidifying and heating mode, the refrigerant does not rapidly flow into the heat absorber 9, and at the changing time from the heating mode to the dehumidifying and heating mode, it is possible to eliminate or decrease the noise generated when the solenoid valve for dehumidifying 22 opens.

Especially, in this embodiment, the controller 32 decreases the number of revolution Nc of the compressor 2, and additionally enlarges the valve position of the outdoor expansion valve 6 in the noise improvement control, and hence it is possible to more rapidly decrease the radiator pressure PCI and the pressure difference before and after the solenoid valve 22. It is to be noted that also in this example as described above, on the basis of the pressure difference ΔPx before and after the solenoid valve 22 (the radiator pressure PCI−the refrigerant pressure on the downstream side), the controller may open the solenoid valve 22 when the pressure difference ΔPx decreases to the predetermined value or less.

(8) Noise Improvement Control (No. 3)

Figure 6:
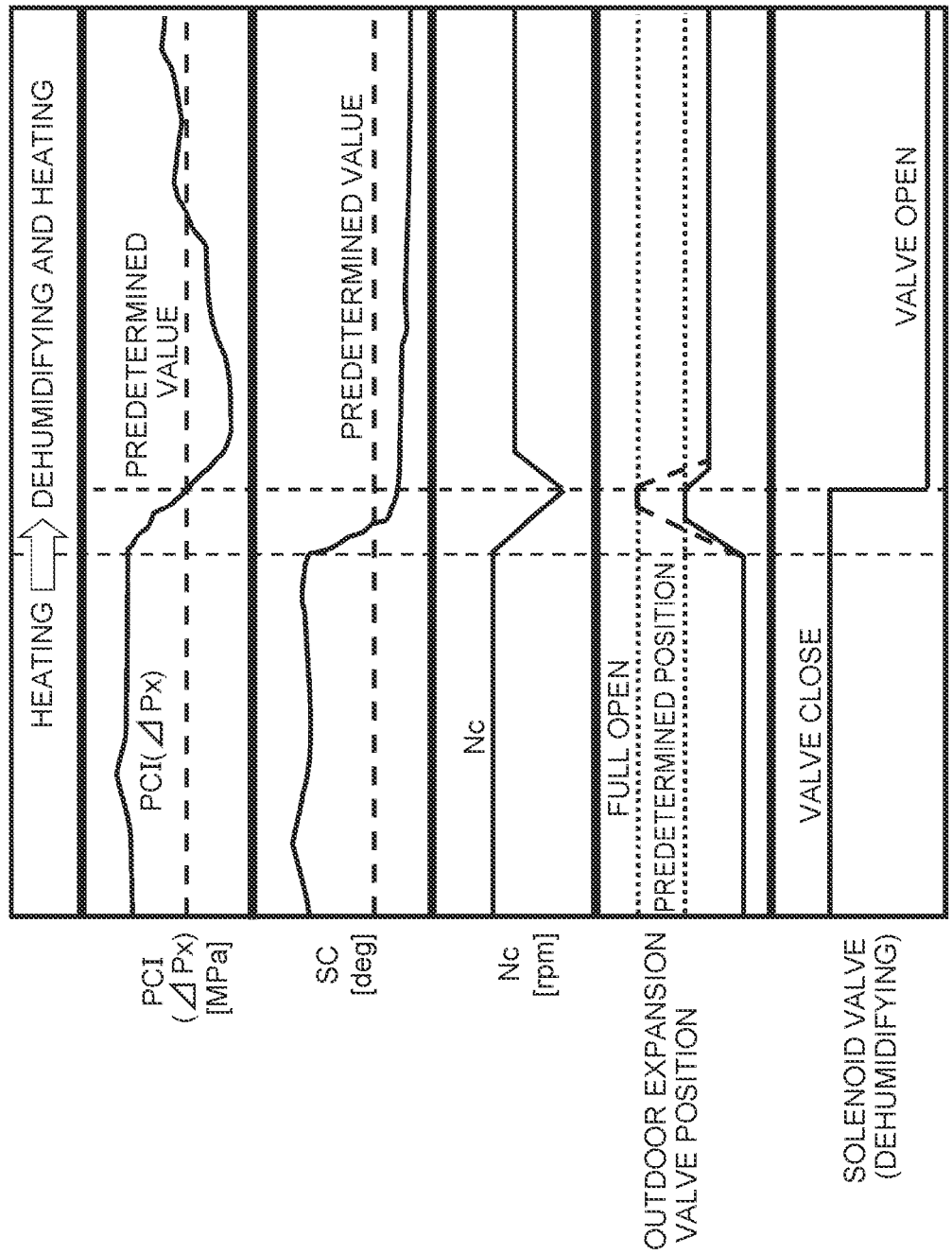
FIG. 6 is a timing chart explaining operations of the compressor, the outdoor expansion valve and the solenoid valve for dehumidifying in still another noise improvement control.

Next, there will be described still another example of the noise improvement control to be executed by the controller 32 when the heating mode changes to the dehumidifying and heating mode, with reference to FIG. 6. When the operation mode changes from the heating mode to the dehumidifying and heating mode, in the noise improvement control of this embodiment, the controller 32 first keeps the solenoid valve for dehumidifying 22 to be closed (i.e., the operation mode is still the heating mode), and decreases the number of revolution Nc of the compressor 2 (decreases the number of revolution at the predetermined inclination angle in the embodiment), and fully opens the valve position of the outdoor expansion valve 6 (at a position of an upper limit of controlling which is shown by a broken line in the drawing) so that a subcool degree SC of the refrigerant of the radiator 4 becomes a predetermined value (a predetermined low value) or less, or executes control to enlarge the valve position to a predetermined position (shown by a solid line in the drawing) (enlarges the valve position at the predetermined inclination angle in the embodiment).

When the number of revolution Nc of the compressor 2 decreases, the pressure of the radiator 4 (the high pressure, i.e., the radiator pressure PCI) decreases in the same manner as described above. Furthermore, the subcool degree SC of the radiator 4 decreases, thereby also decreasing the radiator pressure PCI, and hence the radiator pressure PCI rapidly decreases as shown in FIG. 6 due to these synergistic operations. Consequently, the pressure difference before and after the solenoid valve 22 (the refrigerant upstream side and the downstream side) also rapidly decreases. Furthermore, when the subcool degree SC of the radiator 4 decreases, a density of a high pressure refrigerant flowing out from the radiator 4 also decreases. Further, when the radiator pressure PCI detected by the radiator pressure sensor 47 becomes the predetermined value (e.g., from 0.5 to 1.3 MPa or the like in the same manner as described above) or less, the controller 32 opens the solenoid valve for dehumidifying 22. Consequently, the operation mode changes to the dehumidifying and heating mode.

After opening the solenoid valve 22, the controller 32 adjusts the control of the number of revolution Nc of the compressor 2 into the proper control state in the dehumidifying and heating mode. Furthermore, the controller also adjusts the control of the subcool degree SC of the radiator 4 by the valve position of the outdoor expansion valve 6 into a proper control state in the dehumidifying and heating mode. Also in this way, when the controller opens the solenoid valve 22 in the case of changing the heating mode to the dehumidifying and heating mode, the refrigerant does not rapidly flow into the heat absorber 9, and at the changing time from the heating mode to the dehumidifying and heating mode, it is possible to eliminate or decrease the noise generated when the solenoid valve for dehumidifying 22 opens.

Especially, according to this example, in the noise improvement control, the controller 32 decreases the number of revolution Nc of the compressor 2, and controls the valve position of the outdoor expansion valve 6 so that the subcool degree SC of the refrigerant of the radiator 4 becomes the predetermined value or less, and opens the solenoid valve 22 after the radiator pressure PCI decreases to the predetermined value or less. Therefore, in addition to the above respective examples, the subcool degree SC of the radiator 4 decreases, thereby decreasing the density of the high pressure side refrigerant, and hence it is possible to further effectively achieve the elimination or the decrease of the noise.

It is to be noted that also in this example as described above, on the basis of the pressure difference ΔPx before and after the solenoid valve 22 (the radiator pressure PCI−the refrigerant pressure on the downstream side), the controller may open the solenoid valve 22 when the pressure difference ΔPx decreases to the predetermined value or less. Furthermore, in this example, the subcool degree SC of the radiator 4 decreases to the predetermined value or less, and on the basis of this decrease, the controller may open the solenoid valve 22.

(9) Noise Improvement Control (No. 4)

Figure 7:
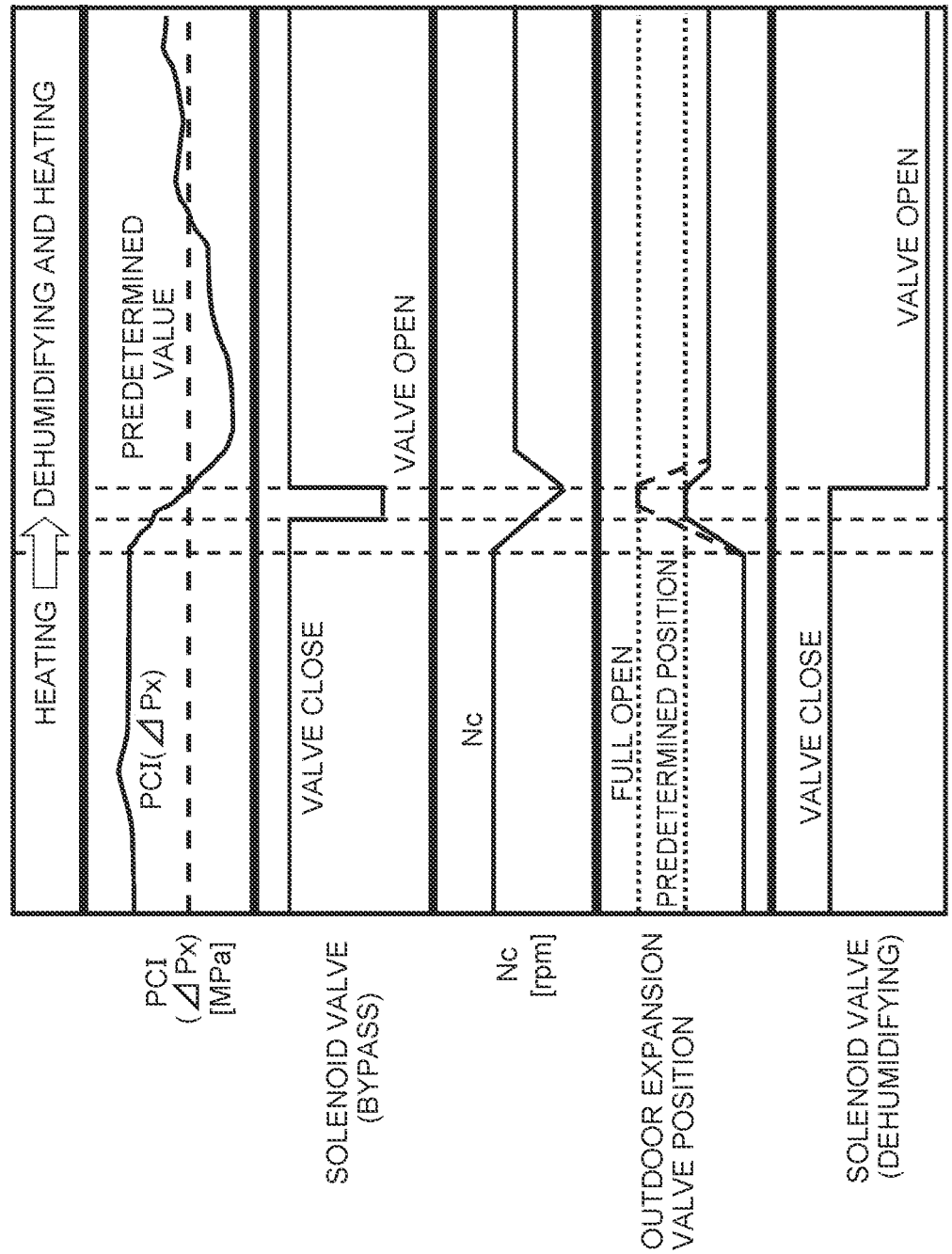
FIG. 7 is a timing chart explaining operations of a solenoid valve for bypass, the compressor, the outdoor expansion valve and the solenoid valve for dehumidifying in further noise improvement control.

Next, there will be described a further example of the noise improvement control to be executed by the controller 32 when the heating mode changes to the dehumidifying and heating mode, with reference to FIG. 7. When the operation mode changes from the heating mode to the dehumidifying and heating mode, in the noise improvement control of this embodiment, the controller 32 first keeps the solenoid valve for dehumidifying 22 to be closed (i.e., the operation mode is still the heating mode), and decreases the number of revolution Nc of the compressor 2 (decreases the number of revolution at the predetermined inclination angle in the embodiment), and fully opens the valve position of the outdoor expansion valve 6 (at a position of an upper limit of controlling which is shown by a broken line in the drawing), or enlarges the valve position of the outdoor expansion valve 6 to a predetermined position (shown by a solid line in the drawing) (enlarges the valve position at the predetermined inclination angle in the embodiment).

When the number of revolution Nc of the compressor 2 decreases, the pressure of the radiator 4 (the high pressure, i.e., the radiator pressure PCI) decreases in the same manner as described above. Furthermore, the valve position of the outdoor expansion valve 6 enlarges, thereby also decreasing the radiator pressure PCI, and hence the radiator pressure PCI rapidly decreases as shown in FIG. 7 due to these synergistic operations. Afterward, when the radiator pressure PCI decreases to a certain degree, the controller 32 opens the solenoid valve for bypass 20. Consequently, the radiator pressure PCI further rapidly decreases, and the pressure difference before and after the solenoid valve 22 (the refrigerant upstream side and the downstream side) also decreases. Further, when the radiator pressure PCI detected by the radiator pressure sensor 47 becomes a predetermined value (from 0.5 to 1.3 MPa or the like) or less, the controller 32 opens the solenoid valve for dehumidifying 22. Consequently, the operation mode changes to the dehumidifying and heating mode.

After opening the solenoid valve 22, the controller 32 adjusts the control of the number of revolution Nc of the compressor 2 into the proper control state in the dehumidifying and heating mode. Furthermore, the controller also adjusts the valve position of the outdoor expansion valve 6 into a proper control state in the dehumidifying and heating mode. Furthermore, the controller also closes the solenoid valve 20. Also in this way, when the controller opens the solenoid valve 22 in the case of changing the heating mode to the dehumidifying and heating mode, the refrigerant does not rapidly flow into the heat absorber 9, and at the changing time from the heating mode to the dehumidifying and heating mode, it is possible to eliminate or decrease the noise generated when the solenoid valve for dehumidifying 22 opens.

Especially, according to this example, in the noise improvement control, the controller 32 decreases the number of revolution Nc of the compressor 2, enlarges the valve position of the outdoor expansion valve 6, and then opens the solenoid valve for bypass 20. The controller opens the solenoid valve 20 after the radiator pressure PCI decreases to the predetermined value or less, and hence it is possible to further rapidly decrease the radiator pressure PCI and the pressure difference before and after the solenoid valve 22 by the solenoid valve for bypass 20. Furthermore, the controller opens the solenoid valve 20 when the radiator pressure PCI decreases, and hence it is also possible to avoid noise at this opening time of the solenoid valve 20.

It is to be noted that also in this example as described above, on the basis of the pressure difference $\Delta Px$ before and after the solenoid valve 22 (the radiator pressure PCI–the refrigerant pressure on the downstream side), the controller may open the solenoid valve 20 when the pressure difference $\Delta Px$ decreases, and may open the solenoid valve 22 when the pressure difference further decreases to the predetermined value or less.

(10) Noise Improvement Control (No. 5)

Figure 8:
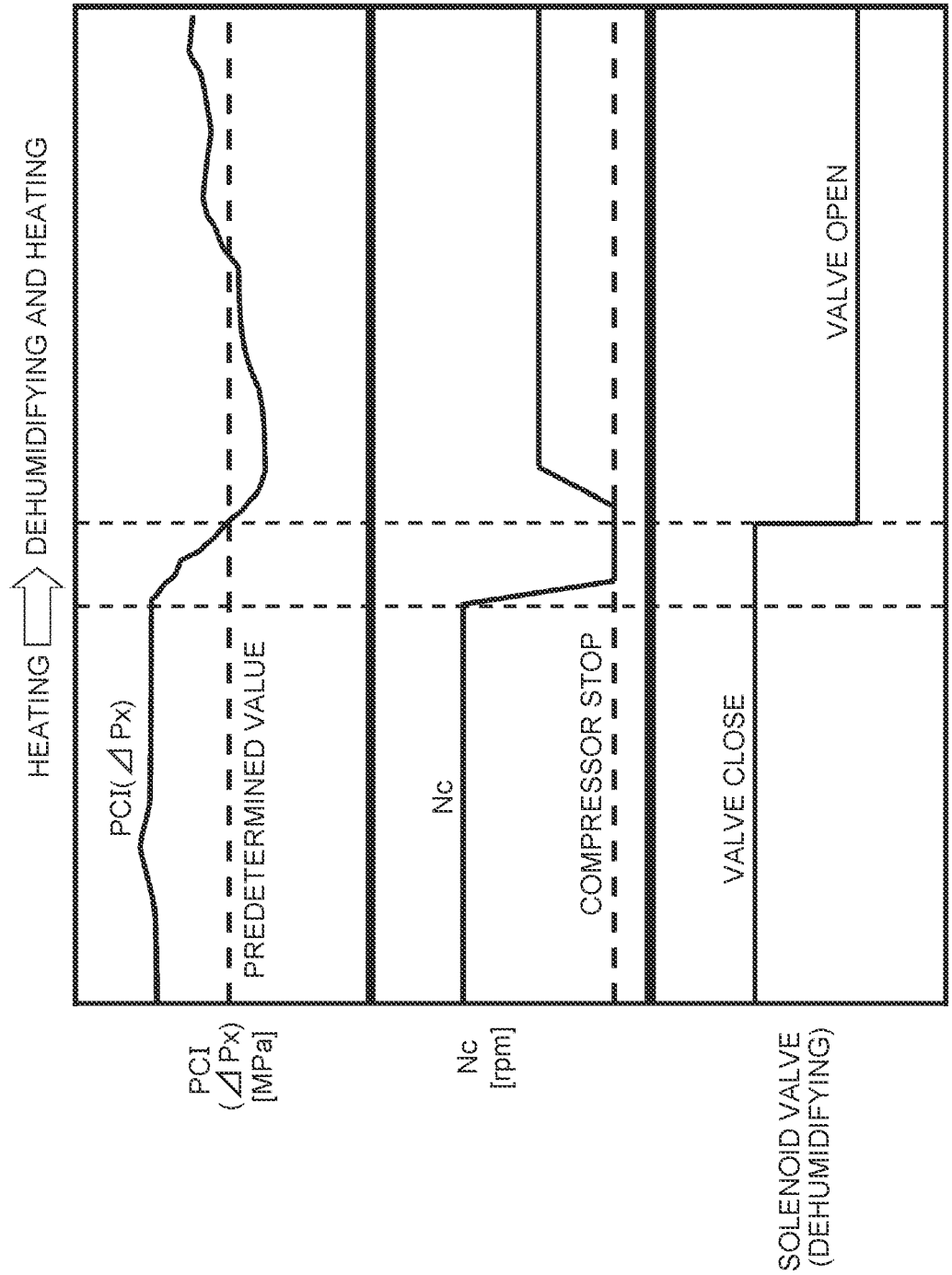
FIG. 8 is a timing chart explaining operations of the compressor and the solenoid valve for dehumidifying in further noise improvement control.

Next, there will be described a further example of the noise improvement control to be executed by the controller 32 when the heating mode changes to the dehumidifying and heating mode, with reference to FIG. 8. In the noise improvement control of this example, the controller 32 stops the compressor 2 instead of decreasing the number of revolution Nc of the compressor 2 when the operation mode changes from the heating mode to the dehumidifying and heating mode in the above-mentioned noise improvement control (No. 1). The compressor 2 stops, thereby rapidly decreasing the radiator pressure PCI as shown in FIG. 8. Consequently, the pressure difference before and after the solenoid valve 22 (the refrigerant upstream side and the downstream side) also rapidly decreases. Further, when the radiator pressure PCI detected by the radiator pressure sensor 47 decreases to a predetermined value (e.g., from 0.5 to 1.3 MPa or the like) or less, the controller 32 opens the solenoid valve for dehumidifying 22. Consequently, the operation mode changes to the dehumidifying and heating mode.

After opening the solenoid valve 22, the controller 32 starts the compressor 2, and adjusts the control of the number of revolution Nc of the compressor into the proper control state in the dehumidifying and heating mode. Also in this way, when the controller opens the solenoid valve 22 in the case of changing the heating mode to the dehumidifying and heating mode, the refrigerant does not rapidly flow into the heat absorber 9, and at the changing time from the heating mode to the dehumidifying and heating mode, it is possible to eliminate or decrease the noise generated when the solenoid valve for dehumidifying 22 opens.

Especially, according to this example, in the noise improvement control, the controller 32 stops the compressor 2, and hence it is possible to further rapidly decrease the radiator pressure PCI and the pressure difference before and after the solenoid valve 22. It is to be noted that also in this example as described above, on the basis of the pressure difference $\Delta Px$ before and after the solenoid valve 22 (the radiator pressure PCI–the refrigerant pressure on the downstream side), the controller may open the solenoid valve 22 when the pressure difference $\Delta Px$ decreases to the predetermined value or less.

(11) Noise Improvement Control (No. 6)

Figure 9:
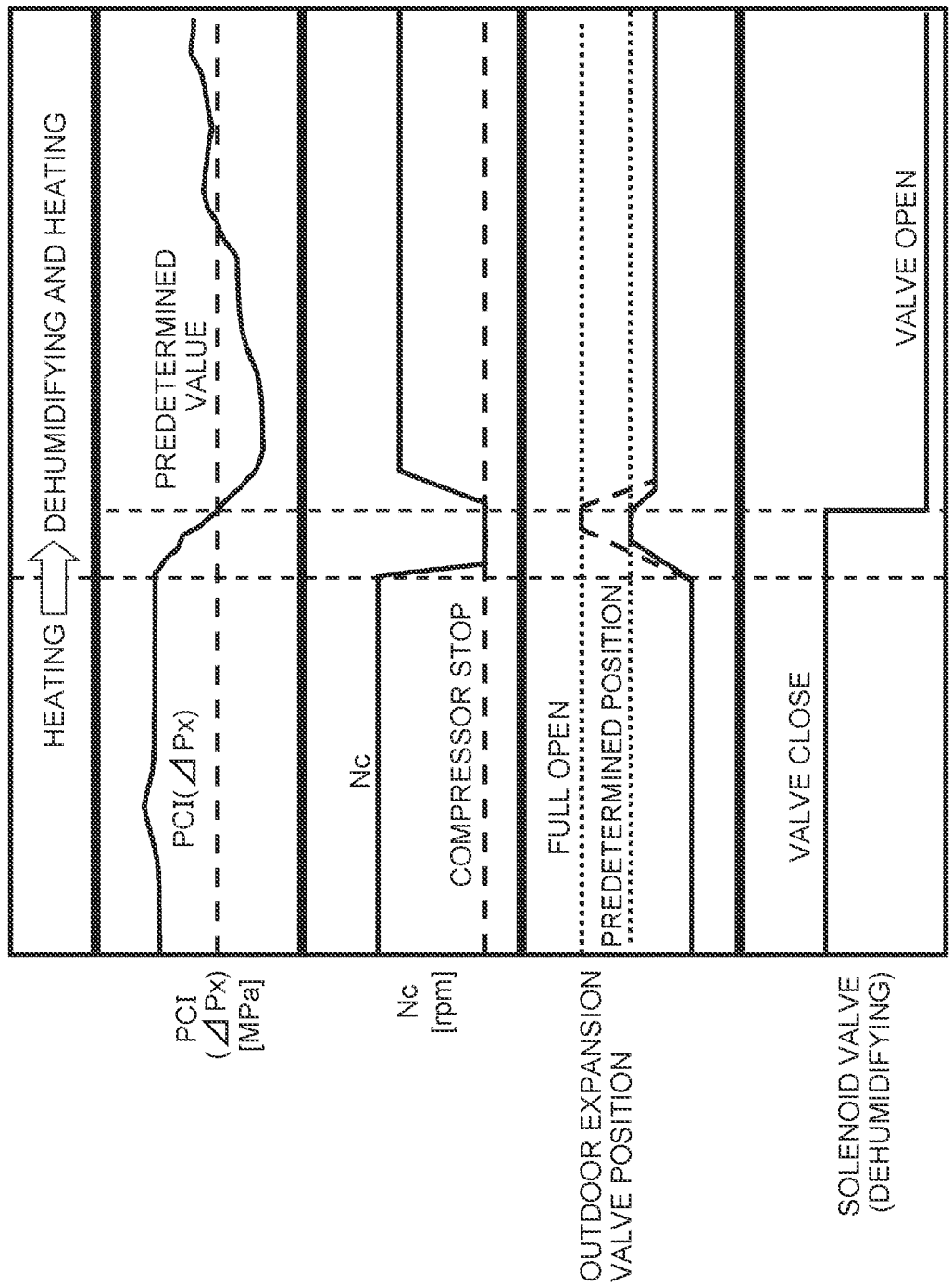
FIG. 9 is a timing chart explaining operations of the compressor, the outdoor expansion valve and the solenoid valve for dehumidifying in further noise improvement control.

Next, there will be described a further example of the noise improvement control to be executed by the controller 32 when the heating mode changes to the dehumidifying and heating mode, with reference to FIG. 9. In the noise improvement control of this example, the controller 32 stops the compressor 2 instead of decreasing the number of revolution Nc of the compressor 2 when the operation mode changes from the heating mode to the dehumidifying and heating mode in the above-mentioned noise improvement control (No. 2). The compressor 2 stops, thereby rapidly decreasing the radiator pressure PCI as shown in FIG. 9 due to a synergistic operation with the enlargement of the valve position of the outdoor expansion valve 6. Consequently, the pressure difference before and after the solenoid valve 22 (the refrigerant upstream side and the downstream side) also rapidly decreases. Further, when the radiator pressure PCI detected by the radiator pressure sensor 47 decreases to a predetermined value (e.g., from 0.5 to 1.3 MPa or the like) or less, the controller 32 opens the solenoid valve for dehumidifying 22. Consequently, the operation mode changes to the dehumidifying and heating mode.

After opening the solenoid valve 22, the controller 32 starts the compressor 2, and adjusts the control of the number of revolution Nc of the compressor into the proper control state in the dehumidifying and heating mode. Furthermore, the controller adjusts the control of the valve position of the outdoor expansion valve 6 into the proper control state in the dehumidifying and heating mode. Also in this way, when the controller opens the solenoid valve 22 in the case of changing the heating mode to the dehumidifying and heating mode, the refrigerant does not rapidly flow into the heat absorber 9, and at the changing time from the heating mode to the dehumidifying and heating mode, it is possible to eliminate or decrease the noise generated when the solenoid valve for dehumidifying 22 opens.

Especially, also according to this example, in the noise improvement control, the controller 32 stops the compressor 2, and hence it is possible to further rapidly decrease the radiator pressure PCI and the pressure difference before and after the solenoid valve 22. It is to be noted that also in this example as described above, on the basis of the pressure difference $\Delta Px$ before and after the solenoid valve 22 (the radiator pressure PCI–the refrigerant pressure on the downstream side), the controller may open the solenoid valve 22 when the pressure difference $\Delta Px$ decreases to the predetermined value or less.

(11-1) Noise Improvement Control (No. 7)

Figure 10:
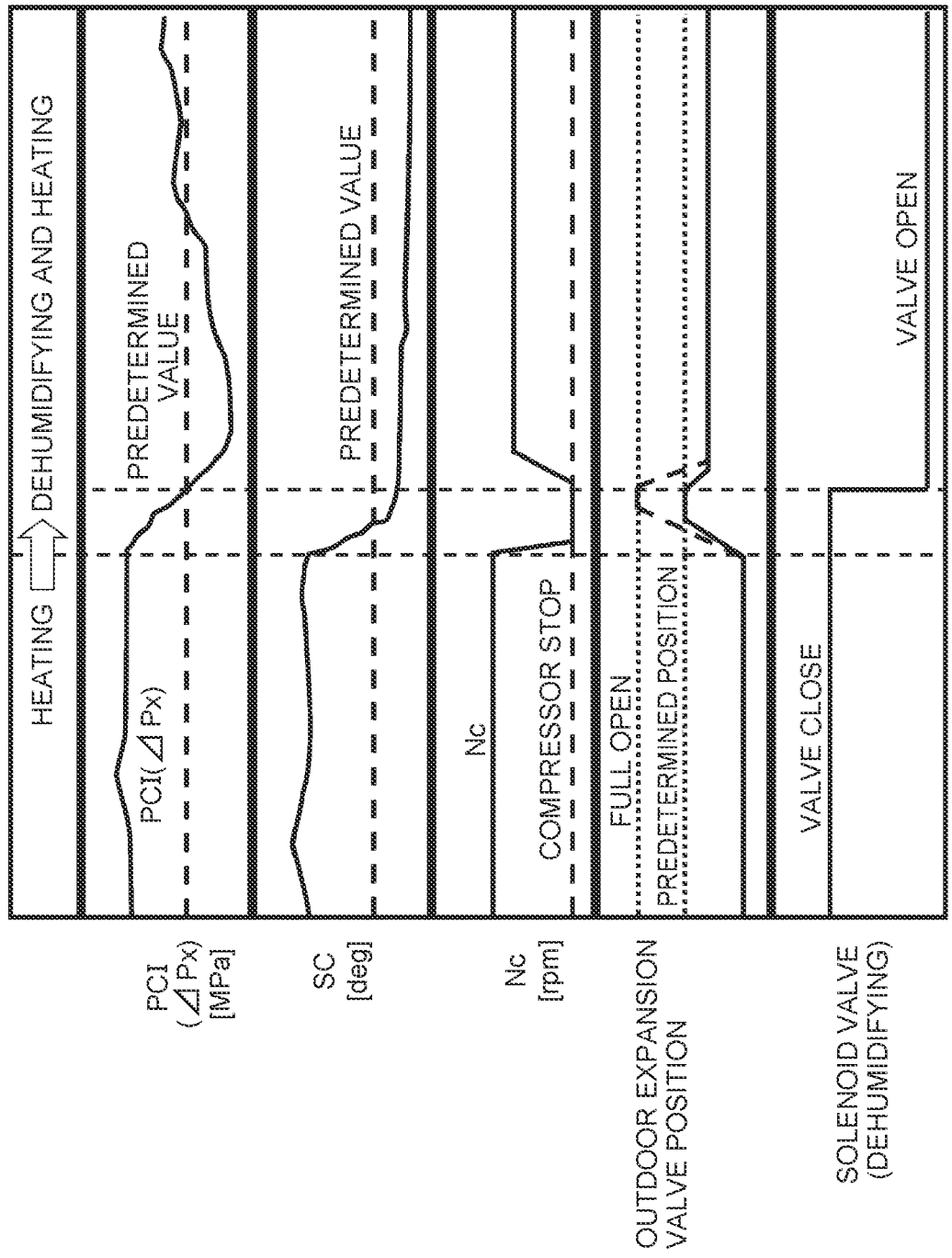
FIG. 10 is a timing chart explaining operations of the compressor, the outdoor expansion valve and the solenoid valve for dehumidifying in further noise improvement control.

Next, there will be described a further example of the noise improvement control to be executed by the controller 32 when the heating mode changes to the dehumidifying and heating mode, with reference to FIG. 10. In the noise improvement control of this example, the controller 32 stops the compressor 2 instead of decreasing the number of revolution Nc of the compressor 2 when the operation mode changes from the heating mode to the dehumidifying and heating mode in the above-mentioned noise improvement control (No. 3). The compressor 2 stops, thereby rapidly decreasing the radiator pressure PCI as shown in FIG. 10 due to a synergistic operation with the decrease of the subcool degree SC of the refrigerant of the radiator 4 by the valve position control of the outdoor expansion valve 6. Consequently, the pressure difference before and after the solenoid valve 22(the refrigerant upstream side and the downstream side) also rapidly decreases. Further, when the radiator pressure PCI detected by the radiator pressure sensor 47 decreases to a predetermined value (e.g., from 0.5 to 1.3 MPa or the like) or less, the controller 32 opens the solenoid valve for dehumidifying 22. Consequently, the operation mode changes to the dehumidifying and heating mode.

After opening the solenoid valve 22, the controller 32 starts the compressor 2, and adjusts the control of the number of revolution Nc of the compressor into the proper control state in the dehumidifying and heating mode. Furthermore, the controller also adjusts the control of the subcool degree SC of the radiator 4 by the valve position of the outdoor expansion valve 6 into the proper control state in the dehumidifying and heating mode. Also in this way, when the controller opens the solenoid valve 22 in the case of changing the heating mode to the dehumidifying and heating mode, the refrigerant does not rapidly flow into the heat absorber 9, and at the changing time from the heating mode to the dehumidifying and heating mode, it is possible to eliminate or decrease the noise generated when the solenoid valve for dehumidifying 22 opens.

Especially, also according to this example, in the noise improvement control, the controller 32 stops the compressor 2, and hence it is possible to further rapidly decrease the radiator pressure PCI and the pressure difference before and after the solenoid valve 22. It is to be noted that also in this example as described above, on the basis of the pressure difference ΔPx before and after the solenoid valve 22 (the radiator pressure PCI−the refrigerant pressure on the downstream side), the controller may open the solenoid valve 22 when the pressure difference ΔPx decreases to the predetermined value or less.

(12) Noise Improvement Control (No. 8)

Next, there will be described a further example of the noise improvement control to be executed by the controller 32 when the heating mode changes to the dehumidifying and heating mode, with reference to FIG. 11. In the noise improvement control of this example, the controller 32 changes the predetermined value of the radiator pressure PCI and the predetermined value of the pressure difference ΔPx in the noise improvement control of the above-mentioned respective control examples (Embodiment 1) and the predetermined value of the subcool degree SC of the refrigerant of the radiator 4, in accordance with the velocity.

Figure 11:
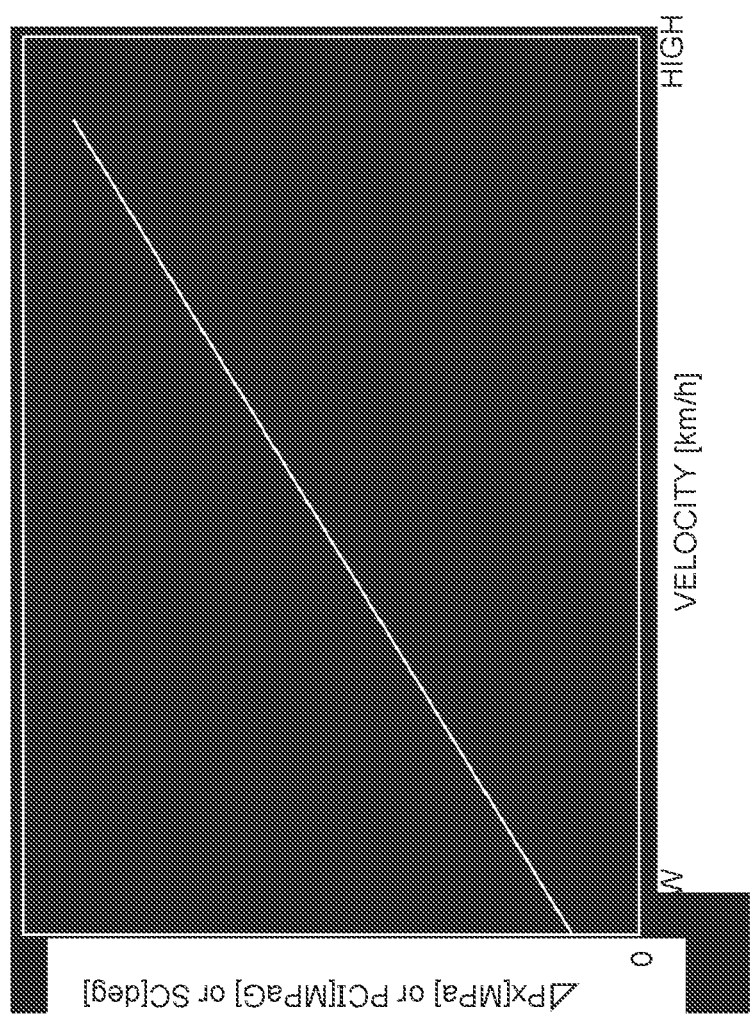
FIG. 11 is a diagram showing a relation between a velocity and a radiator pressure or the like in further noise improvement control.

In this case, as the velocity is higher, the controller 32 increases the above predetermined value of the radiator pressure PCI, or the predetermined value of the pressure difference ΔPx before and after the solenoid valve 22, or the predetermined value of the subcool degree SC of the radiator 4 in a linear functional manner as shown in FIG. 11 in the example. Here, as the velocity is higher, an amount of the outdoor air flowing into the outdoor heat exchanger 7 increases, and the refrigerant pressure of the outdoor heat exchanger 7 increases, and hence it is possible to eliminate or decrease the noise even when increasing the predetermined value of the radiator pressure PCI, or the predetermined value of the pressure difference ΔPx before and after the solenoid valve 22, or the predetermined value of the subcool degree SC of the radiator 4. Consequently, it is possible to open the solenoid valve 22 earlier and rapidly change to the dehumidifying and heating mode.

It is to be noted that in this example, each of the above predetermined values increases in the linear functional manner in accordance with the increase of the velocity, but the present invention is not limited to this example, and in a case where the velocity is not less than a predetermined value, the controller may increase each of the above predetermined values higher than in a case where the velocity is low.

(13) Noise Improvement Control (No. 9)

Next, there will be described a still further example of the noise improvement control to be executed by the controller 32 when the heating mode changes to the dehumidifying and heating mode, with reference to FIG. 12. In the noise improvement control of this example, the controller 32 changes the predetermined value of the radiator pressure PCI and the predetermined value of the pressure difference ΔPx in the noise improvement control of the above-mentioned respective control examples (Embodiment 1) and the predetermined value of the subcool degree SC of the refrigerant of the radiator 4, in accordance with the air volume of the indoor blower 27.

Figure 12:
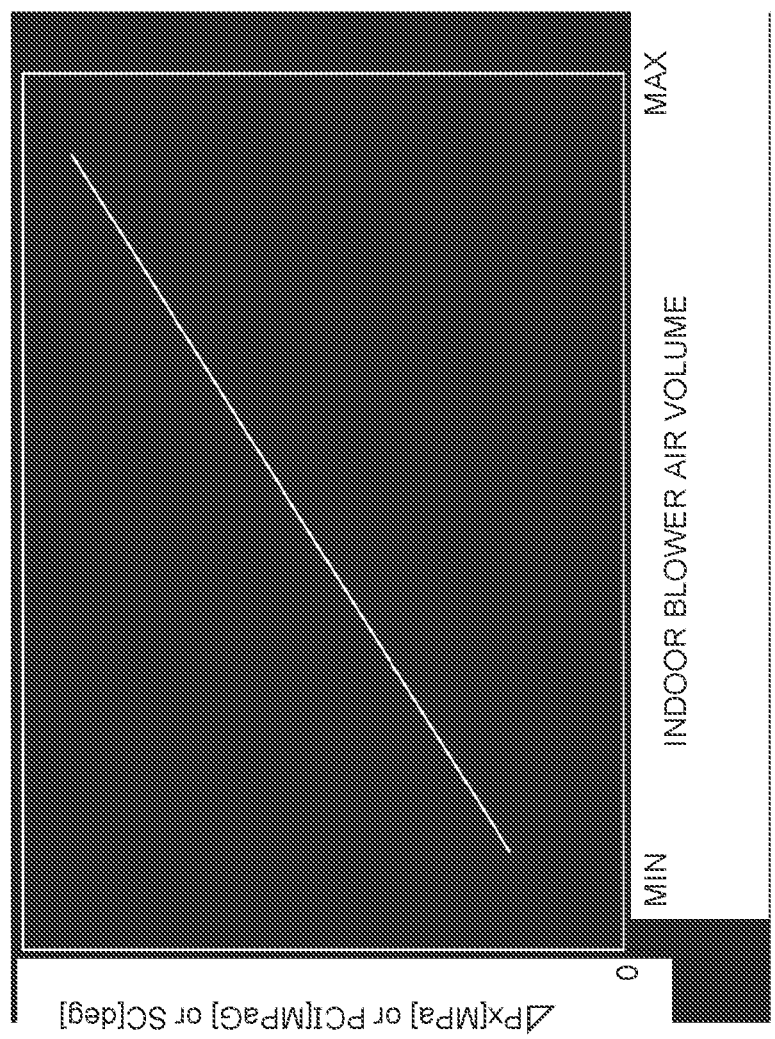
FIG. 12 is a diagram showing a relation between an indoor blower air volume and the radiator pressure or the like in still further noise improvement control.

In this case, as the air volume of the indoor blower 27 decreases (from MAX to MIN), the controller 32 decreases the above predetermined value of the radiator pressure PCI, or the predetermined value of the pressure difference ΔPx before and after the solenoid valve 22, or the predetermined value of the subcool degree SC of the radiator 4 in a linear functional manner as shown in FIG. 12 in the example. Here, as the air volume of the indoor blower 27 decreases, the radiator pressure PCI increases, and hence the controller decreases the predetermined value of the radiator pressure PCI, or the predetermined value of the pressure difference ΔPx before and after the solenoid valve 22, or the predetermined value of the subcool degree SC of the radiator 4, so that in a situation where the radiator pressure PCI increases, it is possible to more securely eliminate or decrease the generation of the noise.

Embodiment 2

(14) Noise Improvement Control (No. 10)

Figure 13:
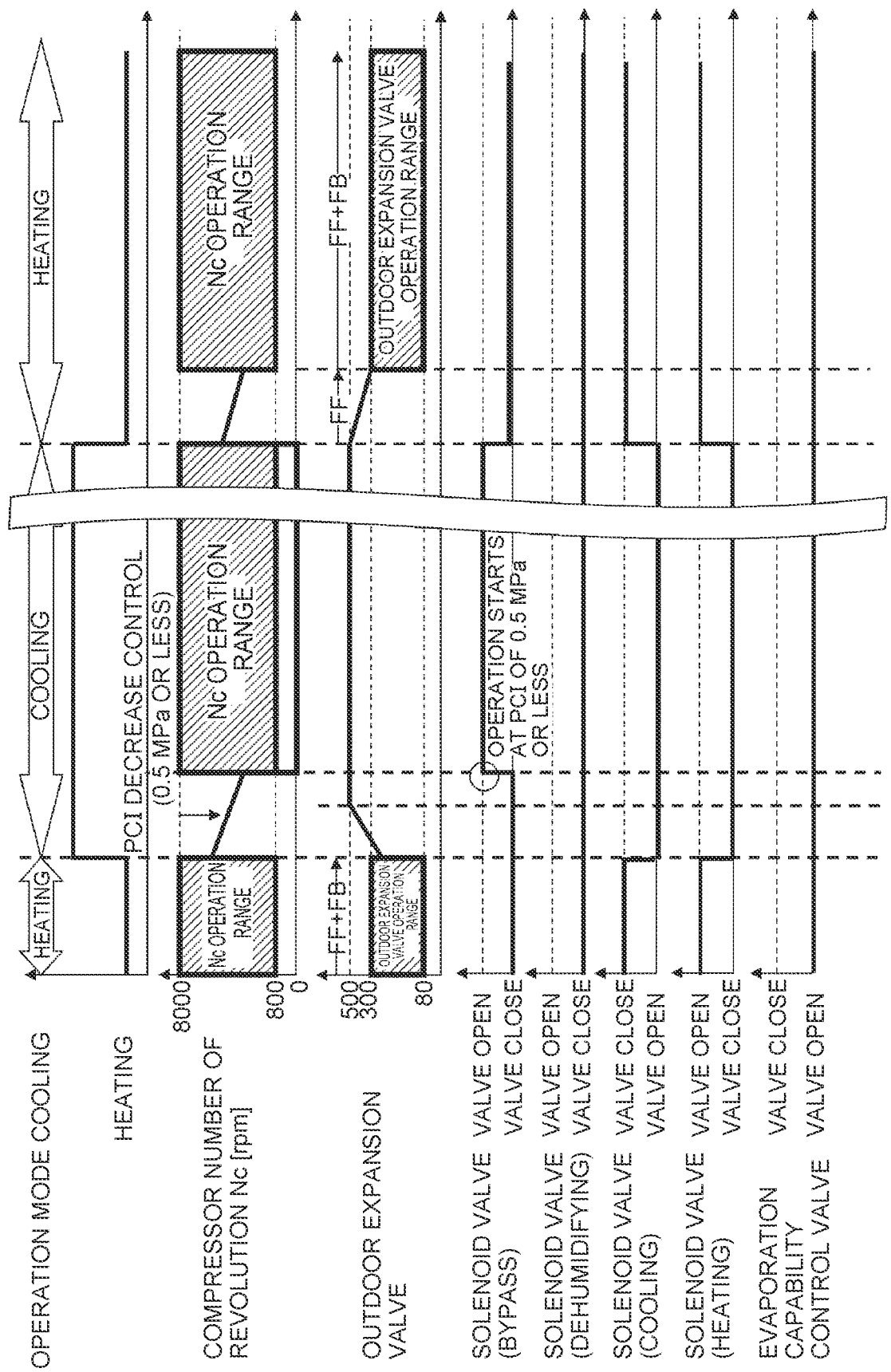
FIG. 13 is a timing chart of each apparatus explaining noise improvement control of another embodiment which is to be executed by the controller of FIG. 2 (Embodiment 2)
Figure 14:
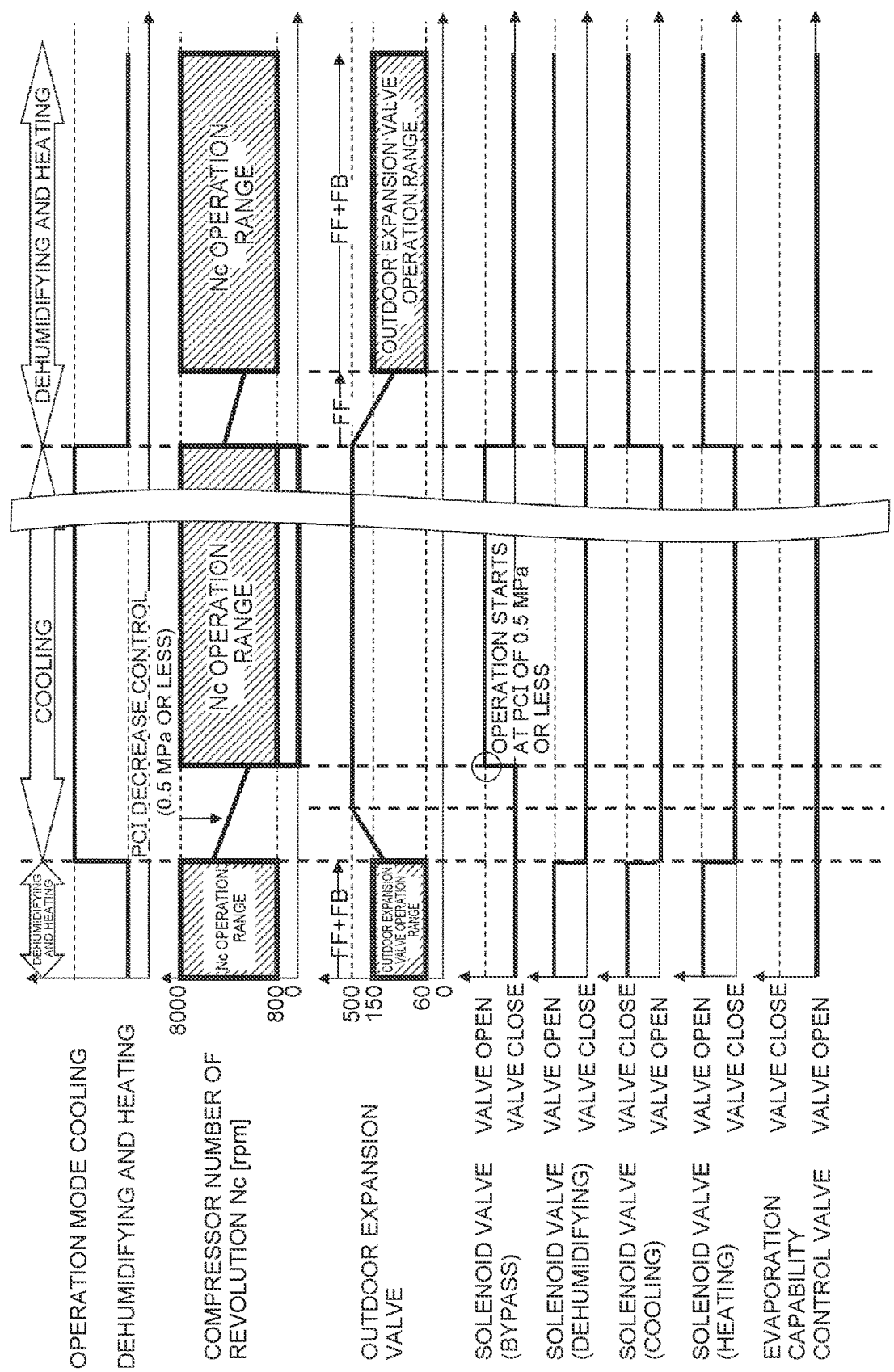
FIG. 14 is another timing chart of each apparatus explaining the noise improvement control of the embodiment which is to be executed by the controller of FIG. 2.
Figure 15:
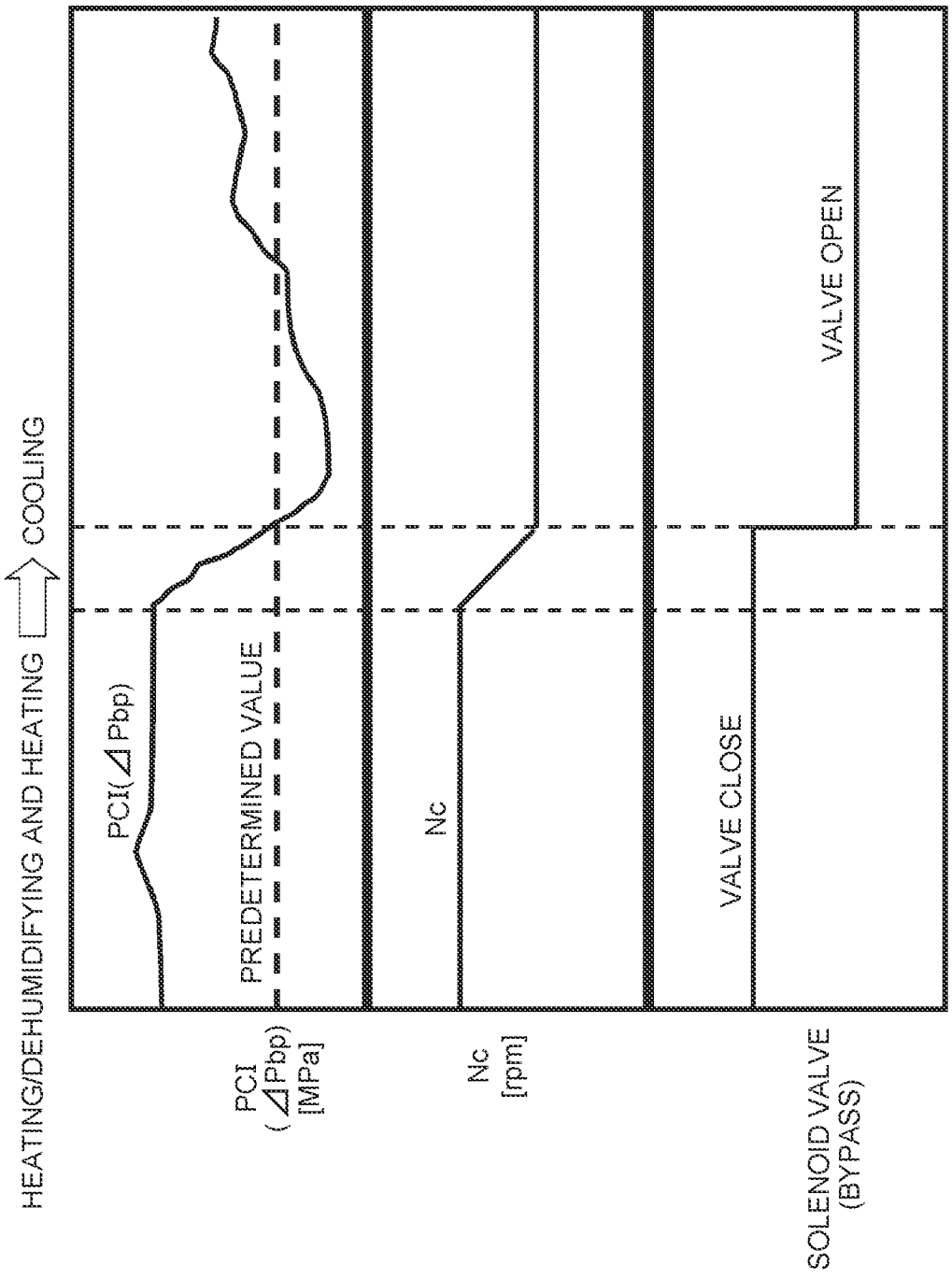
FIG. 15 is a timing chart explaining operations of a compressor and a solenoid valve for bypass in FIG. 13 and FIG. 14.

Next, there will be described one example of noise improvement control to be executed by a controller 32 when a heating mode or a dehumidifying and heating mode changes to a cooling mode, with reference to FIG. 13 to FIG. 15. As described above, in the heating mode and the dehumidifying and heating mode, a solenoid valve for bypass 20 which is connected in parallel with an outdoor expansion valve 6 is closed, but in the cooling mode, the solenoid valve 20 is opened. However, when the solenoid valve 20 opens, an upstream side of the solenoid valve 20 (a radiator 4 side) has a high pressure, and hence there has been the disadvantage that when the solenoid valve 20 opens, a refrigerant flows into an outdoor heat exchanger 7 at once and intense noise is generated.

To eliminate such a problem, in this embodiment, when the operation mode changes from the heating mode to the cooling mode (FIG. 13) and changes from the dehumidifying and heating mode to the cooling mode (FIG. 14), the controller 32 first keeps the solenoid valve for bypass 20 to be closed (i.e., the operation mode is still the heating mode/the dehumidifying and heating mode), and decreases a number of revolution Nc of a compressor 2 (decreases the number of revolution at a predetermined inclination angle in the embodiment). When the number of revolution Nc of the compressor 2 decreases, a pressure of the radiator 4 (a high pressure, i.e., a radiator pressure PCI) decreases as shown in FIG. 15. Consequently, a pressure difference before and after the solenoid valve 20 (a refrigerant upstream side and a downstream side) also decreases. Further, when the radiator pressure PCI detected by a radiator pressure sensor 47 becomes a predetermined value (e.g., 0.5 MPa or the like) or less, the controller 32 opens the solenoid valve for bypass 20. Consequently, the operation mode changes to the cooling mode.

After opening the solenoid valve 20, the controller 32 adjusts control of the number of revolution Nc of the compressor 2 into a proper control state in the cooling mode. In this way, when the operation mode changes from the heating mode and the dehumidifying and heating mode to the cooling mode, the controller 32 executes the noise improvement control to decrease the radiator pressure PCI to the predetermined value or less and then to open the solenoid valve for bypass 20, and hence when the controller opens the solenoid valve 20 in the case of changing from the heating mode and the dehumidifying and heating mode to the cooling mode, the refrigerant does not rapidly flow into the outdoor heat exchanger 7. In consequence, at the changing time from the heating mode and the dehumidifying and heating mode to the cooling mode, it is possible to eliminate or decrease noise generated when the solenoid valve for bypass 20 opens.

Furthermore, in this case, the controller 32 decreases the number of revolution Nc of the compressor 2 in the noise improvement control, and hence it is possible to effectively decrease the radiator pressure PCI and the pressure difference before and after the solenoid valve 20 in the noise improvement control.

It is to be noted that in the above embodiment, when the radiator pressure PCI decreases to the predetermined value, the controller opens the solenoid valve for bypass 20, but on the basis of an output of an outdoor heat exchanger pressure sensor 56 to detect a pressure PXO of the outdoor heat exchanger 7 which is a refrigerant pressure on the downstream side of the solenoid valve 20 and on the basis of a pressure difference ΔPbp before and after the solenoid valve 20 (the radiator pressure PCI−the outdoor heat exchanger pressure PXO), the controller may open the solenoid valve 20 when the pressure difference ΔPbp decreases to a predetermined value or less. Furthermore, in the embodiment, a vehicular air-conditioning device executes the noise improvement control in the case of changing from the heating mode and the dehumidifying and heating mode change to the cooling mode, but the vehicular air-conditioning device may execute the noise improvement control in the case of changing from one of the heating mode and the dehumidifying and heating mode to the cooling mode (this also applies to the following embodiments).

(15) Noise Improvement Control (No. 11)

Figure 16:
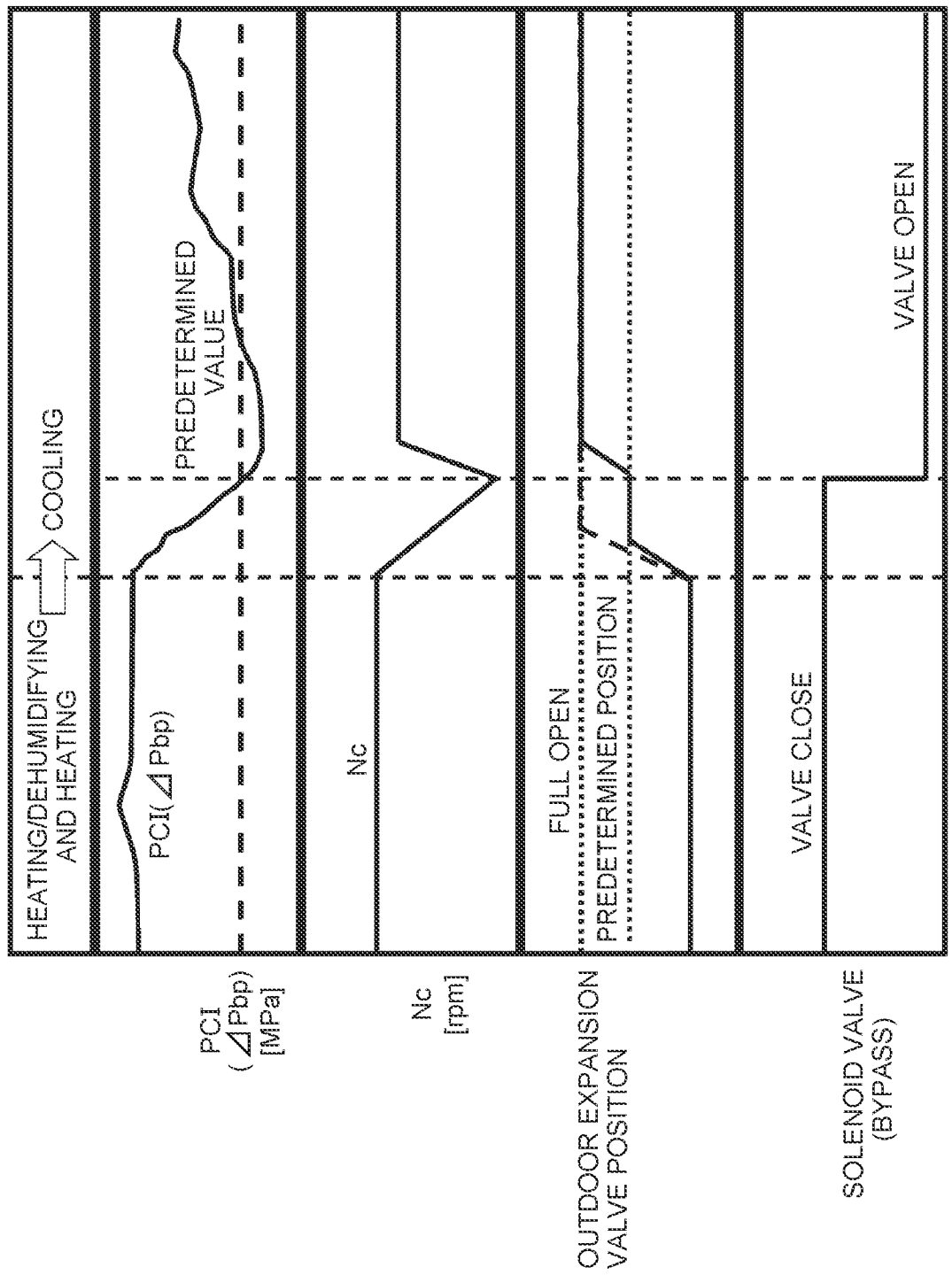
FIG. 16 is a timing chart explaining operations of the compressor, an outdoor expansion valve and the solenoid valve for bypass in still another noise improvement control.

Next, there will be described another example of the noise improvement control to be executed by the controller 32 when the heating mode/the dehumidifying and heating mode changes to the cooling mode, with reference to FIG. 16. In the noise improvement control of this embodiment, when the operation mode changes from the heating mode/the dehumidifying and heating mode to the cooling mode, the controller 32 first keeps the solenoid valve for bypass 20 to be closed (i.e., the operation mode is still the heating mode/the dehumidifying and heating mode), and decreases the number of revolution Nc of the compressor 2 (decreases the number of revolution at the predetermined inclination angle in the embodiment), and fully opens the outdoor expansion valve 6 (at a position of an upper limit of controlling which is shown by a broken line in the drawing) or enlarges the valve position of the outdoor expansion valve 6 to a predetermined position (shown by a solid line in the drawing) (enlarges the valve position at the predetermined inclination angle in the embodiment).

When the number of revolution Nc of the compressor 2 decreases, the pressure of the radiator 4 (the high pressure, i.e., the radiator pressure PCI) decreases in the same manner as described above. Furthermore, the valve position of the outdoor expansion valve 6 enlarges, thereby also decreasing the radiator pressure PCI, and hence the radiator pressure PCI rapidly decreases as shown in FIG. 16 due to these synergistic operations. Consequently, the pressure difference before and after the solenoid valve 20 (the refrigerant upstream side and the downstream side) also rapidly decreases. Further, when the radiator pressure PCI detected by the radiator pressure sensor 47 decreases to a predetermined value (0.5 MPa or the like in the same manner as described above) or less, the controller 32 opens the solenoid valve for bypass 20. Consequently, the operation mode changes to the cooling mode.

After opening the solenoid valve 20, the controller 32 adjusts the control of the number of revolution Nc of the compressor 2 into the proper control state in the cooling mode. Furthermore, the controller also adjusts the valve position of the outdoor expansion valve 6 into a fully open position (an upper limit of controlling) in the cooling mode. Also in this way, when the controller opens the solenoid valve 20 in the case of changing the heating mode/the dehumidifying and heating mode to the cooling mode, the refrigerant does not rapidly flow into the outdoor heat exchanger 7 when the solenoid valve 20 opens, and at the changing time from the heating mode/the dehumidifying and heating mode to the cooling mode, it is possible to eliminate or decrease the noise generated when the solenoid valve for bypass 20 opens.

Especially, according to this example, in the noise improvement control, the controller 32 decreases the number of revolution Nc of the compressor 2, and additionally enlarges the valve position of the outdoor expansion valve 6, and hence it is possible to more rapidly decrease the radiator pressure PCI and the pressure difference before and after the solenoid valve 20. It is to be noted that also in the example as described above, on the basis of the pressure difference ΔPbp before and after the solenoid valve 20 (the radiator pressure PCI−the outdoor heat exchanger pressure PXO), the controller may open the solenoid valve 20 when the pressure difference ΔPbp decreases to the predetermined value or less.

(16) Noise Improvement Control (No. 12)

Figure 17:
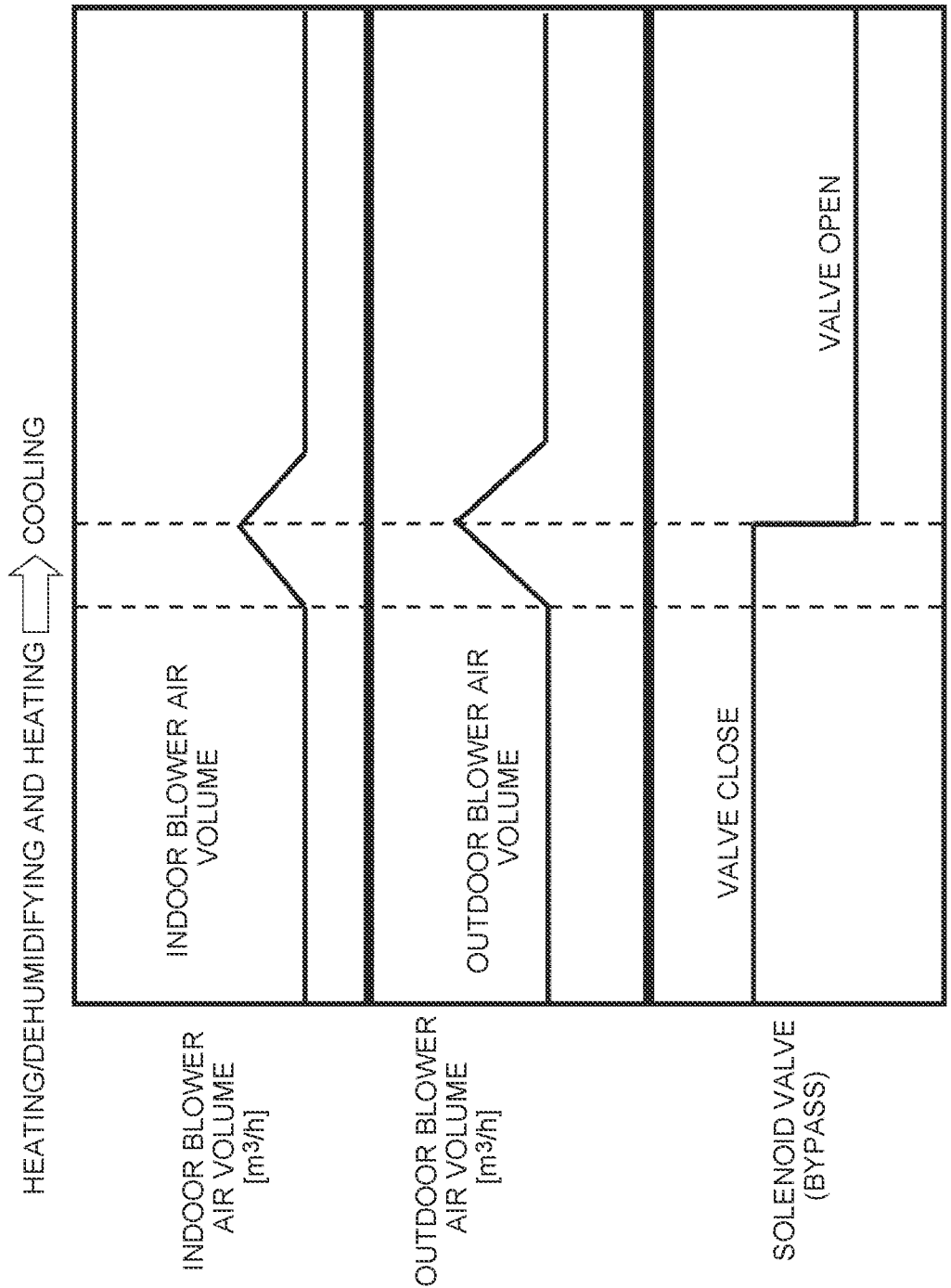
FIG. 17 is a timing chart explaining operations of an indoor blower, an outdoor blower and the solenoid valve for bypass in further noise improvement control.

Next, there will be described still another example of the noise improvement control to be executed by the controller 32 when the heating mode/the dehumidifying and heating mode changes to the cooling mode, with reference to FIG. 17. When the operation mode changes from the heating mode/the dehumidifying and heating mode to the cooling mode, in the noise improvement control of this embodiment, the controller 32 first keeps the solenoid valve for bypass 20 to be closed (i.e., the operation mode is still the heating mode/the dehumidifying and heating mode), and increases an air volume of an indoor blower 27 and an air volume (an operation ratio) of an outdoor blower 15 immediately before changing the operation mode.

The air volume of the indoor blower 27 increases, thereby decreasing the radiator pressure PCI. Furthermore, the air volume of the outdoor blower 15 increases, thereby increasing the outdoor heat exchanger pressure PXO. It is possible to effectively decrease the radiator pressure PCI and the pressure difference ΔPbp before and after the solenoid valve 20 due to a synergistic effect of these operations. Further, when the radiator pressure PCI detected by the radiator pressure sensor 47 becomes the predetermined value(0.5 MPa or the like in the same manner as described above) or less, the controller 32 opens the solenoid valve for bypass 20. Consequently, the operation mode changes to the cooling mode.

After opening the solenoid valve 20, the controller 32 adjusts control of the indoor blower 27 and the outdoor blower 15 into a proper control state in the cooling mode. Also in this way, when the controller opens the solenoid valve 20 in the case of changing the heating mode/the dehumidifying and heating mode to the cooling mode, the refrigerant does not rapidly flow into the outdoor heat exchanger 7, and at the changing time from the heating mode/the dehumidifying and heating mode to the cooling mode, it is possible to eliminate or decrease the noise generated when the solenoid valve for bypass 20 opens.

It is to be noted that also in this example as described above, on the basis of the pressure difference ΔPbp before and after the solenoid valve 20 (the radiator pressure PCI–the outdoor heat exchanger pressure PXO), the controller may open the solenoid valve 20 when the pressure difference ΔPbp decreases to the predetermined value or less. Furthermore, in this example, the air volumes of both the indoor blower 27 and the outdoor blower 15 increase, but one of the air volumes may increase.

(17) Noise Improvement Control (No. 13)

Figure 18:
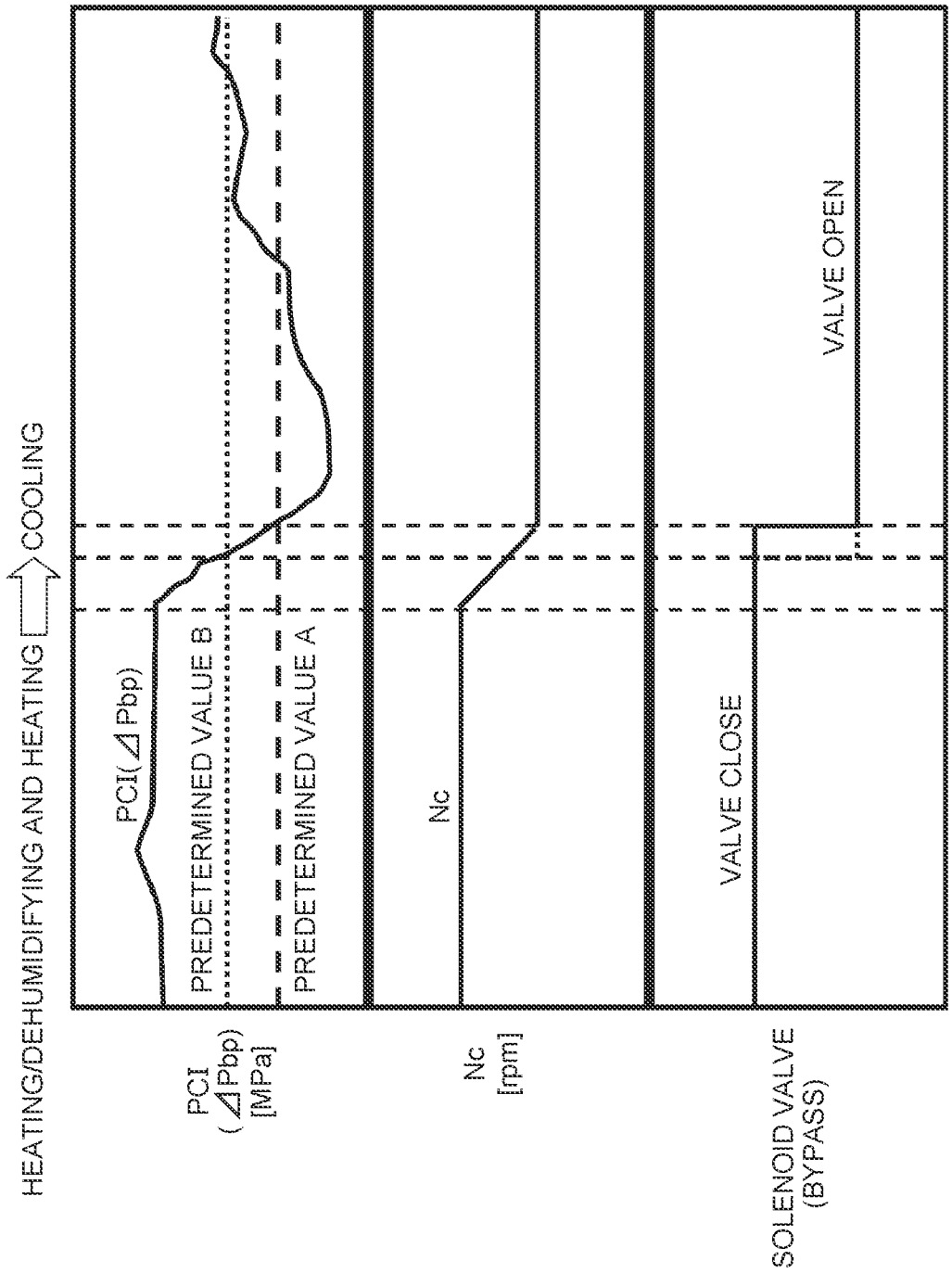
FIG. 18 is a timing chart explaining operations of the compressor and the solenoid valve for bypass in further noise improvement control.

Next, there will be described a further example of the noise improvement control to be executed by the controller 32 when the heating mode/the dehumidifying and heating mode changes to the cooling mode, with reference to FIG. 18. In the noise improvement control of this example, the controller 32 changes the predetermined value of the radiator pressure PCI or the predetermined value of the pressure difference ΔPbp before and after the solenoid valve 20 of FIG. 15 or FIG. 16 in accordance with a velocity (FIG. 18 shows an example applied to the example of FIG. 15). That is, in a case where the velocity is not less than a predetermined value (e.g., 40 km/h), the controller adjusts each predetermined value into a high predetermined value B, and in a case where the velocity is low (in the case where the velocity is lower than 40 km/h), the controller adjusts each predetermined value into a low predetermined value A.

In the case where the velocity is high, an amount of outdoor air flowing into the outdoor heat exchanger 7 increases, and hence the outdoor heat exchanger pressure PXO increases. Therefore, it is possible to eliminate or decrease the noise even when the predetermined value of the radiator pressure PCI or the predetermined value of the pressure difference ΔPdp before and after the solenoid valve20 changes from the low predetermined value A to the high predetermined value B. Consequently, it is possible to open the solenoid valve 20 earlier and rapidly change to the cooling mode.

It is to be noted that as in the above-mentioned example of FIG. 10, a subcool degree SC of the refrigerant of the radiator 4 may decrease also in the noise improvement control of this case. A predetermined value of the subcool degree SC of this case may also change in the same manner as in the above respective predetermined values.

(18) Noise Improvement Control (No. 14)

Figure 19:
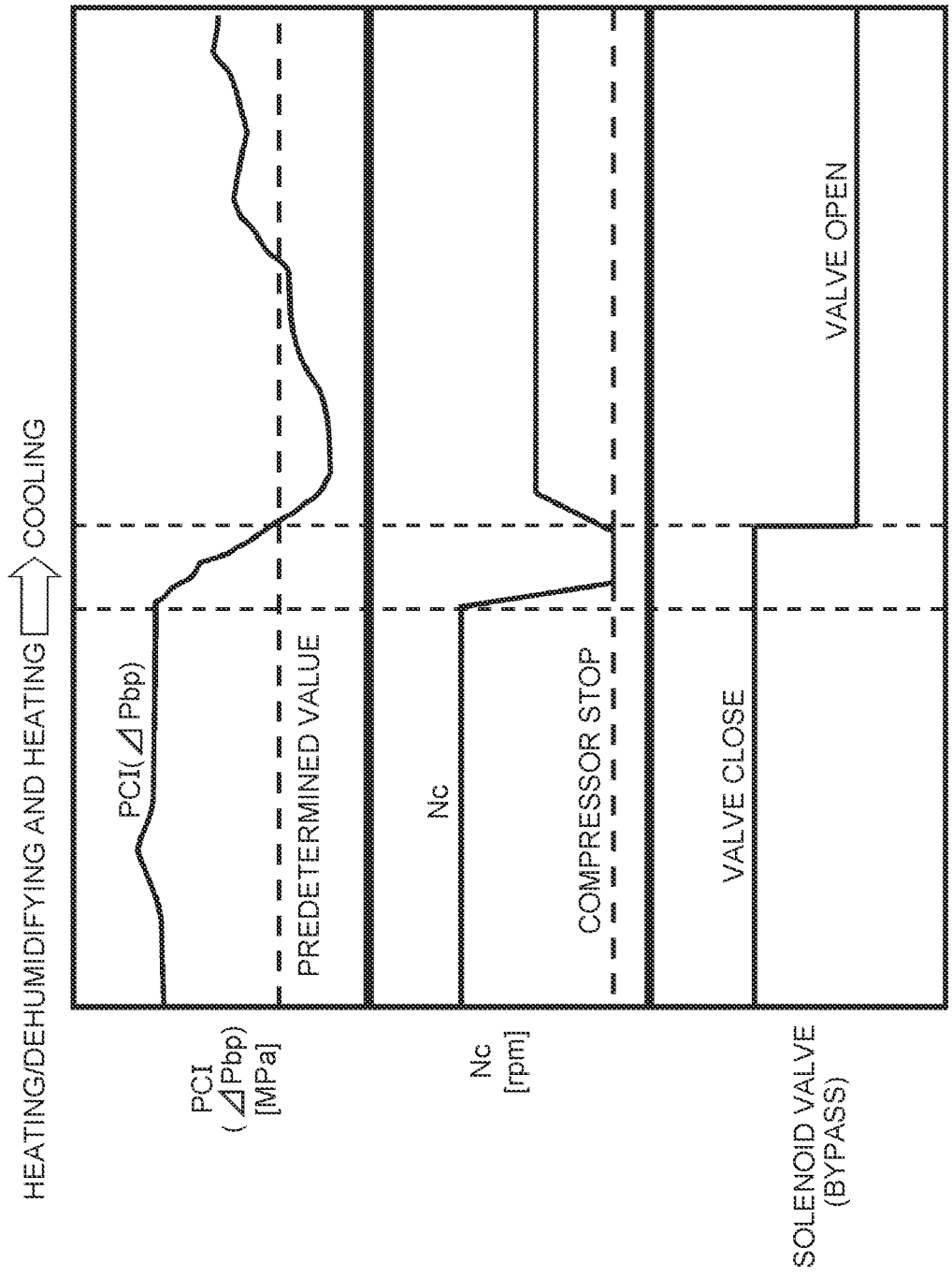
FIG. 19 is a timing chart explaining operations of the compressor and the solenoid valve for bypass in further noise improvement control.

Next, there will be described a further example of the noise improvement control to be executed by the controller 32 when the heating mode/the dehumidifying and heating mode changes to the cooling mode, with reference to FIG. 19. In the noise improvement control of this example, the controller 32 stops the compressor 2 instead of decreasing the number of revolution Nc of the compressor 2 when the operation mode changes from the heating mode/the dehumidifying and heating mode to the cooling mode in the above-mentioned noise improvement control (No. 10). The compressor 2 stops, thereby rapidly decreasing the radiator pressure PCI as shown in FIG. 19. Consequently, the pressure difference before and after the solenoid valve 20 (the refrigerant upstream side and the downstream side) also rapidly decreases. Further, when the radiator pressure PCI detected by the radiator pressure sensor 47 decreases to a predetermined value (e.g., 0.5 MPa or the like) or less, the controller 32 opens the solenoid valve for bypass 20. Consequently, the operation mode changes to the cooling mode.

After opening the solenoid valve 20, the controller 32 starts the compressor 2, and adjusts the control of the number of revolution Nc of the compressor into the proper control state in the cooling mode. Also in this way, when the controller opens the solenoid valve 20 in the case of changing from the heating mode/the dehumidifying and heating mode to the cooling mode, the refrigerant does not rapidly flow into the outdoor heat exchanger 7, and at the changing time from the heating mode/the dehumidifying and heating mode to the cooling mode, it is possible to eliminate or decrease the noise generated when the solenoid valve for bypass 20 opens.

Especially, according to this example, in the noise improvement control, the controller 32 stops the compressor 2, and hence it is possible to further rapidly decrease the radiator pressure PCI and the pressure difference before and after the solenoid valve 20. It is to be noted that also in this example as described above, on the basis of the pressure difference ΔPbp before and after the solenoid valve 20 (the radiator pressure PCI–the outdoor heat exchanger pressure PXO), the controller may open the solenoid valve 20 when the pressure difference ΔPbp decreases to the predetermined value or less.

(19) Noise Improvement Control (No. 15)

Figure 20:
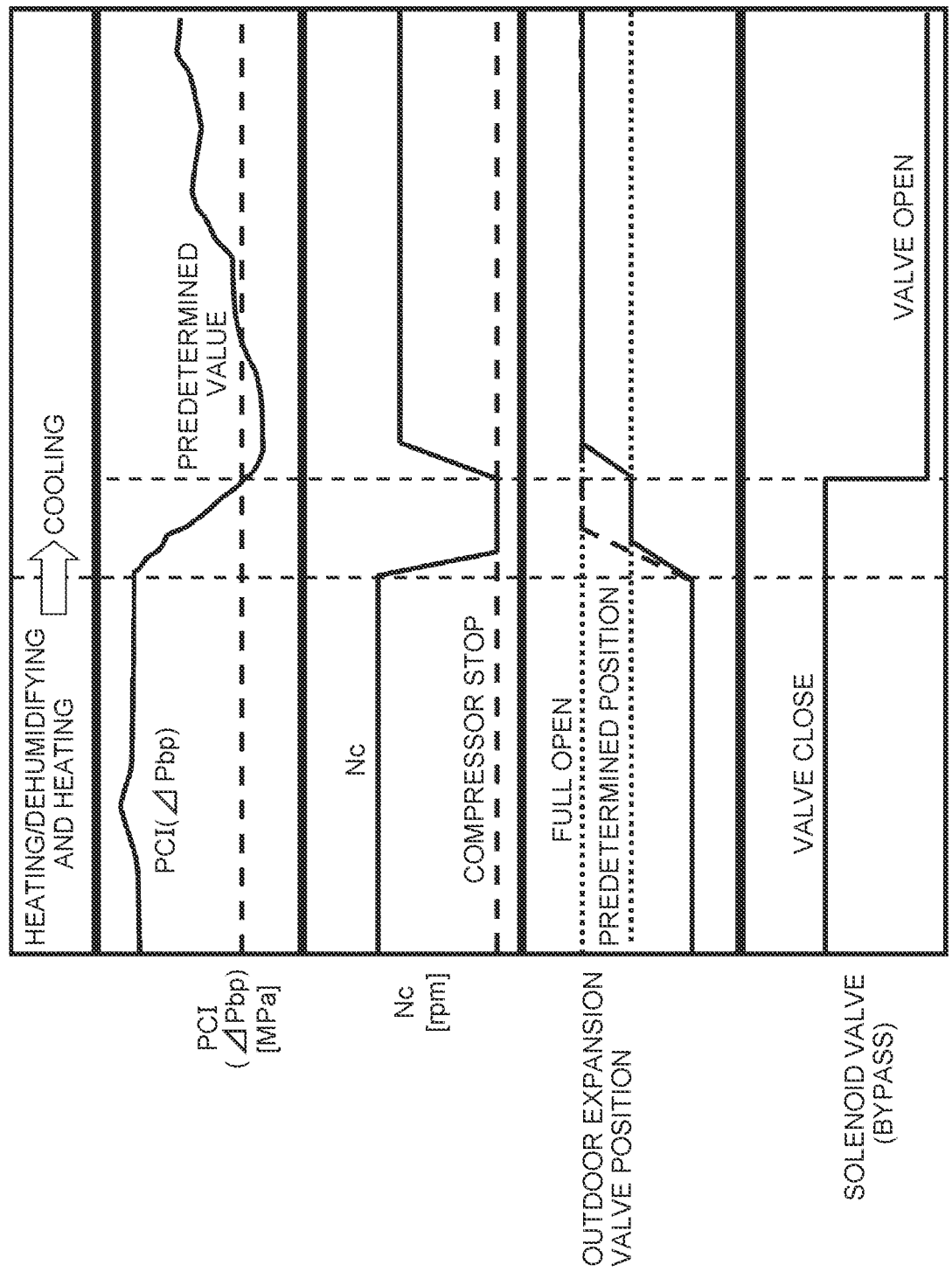
FIG. 20 is a timing chart explaining operations of the compressor, the outdoor expansion valve and the solenoid valve for bypass in further noise improvement control.

Next, there will be described a further example of the noise improvement control to be executed by the controller 32 when the heating mode/the dehumidifying and heating mode changes to the cooling mode, with reference to FIG. 20. In the noise improvement control of this example, the controller 32 stops the compressor 2 instead of decreasing the number of revolution Nc of the compressor 2 when the operation mode changes from the heating mode/the dehumidifying and heating mode to the cooling mode in the above-mentioned noise improvement control (No. 11). The compressor 2 stops, thereby rapidly decreasing the radiator pressure PCI as shown in FIG. 20 due to a synergistic operation with the enlargement of the valve position of the outdoor expansion valve 6. Consequently, the pressure difference before and after the solenoid valve 20 (the refrigerant upstream side and the downstream side) also rapidly decreases. Further, when the radiator pressure PCI detected by the radiator pressure sensor 47 decreases to a predetermined value (e.g., from 0.5 MPa or the like) or less, the controller 32 opens the solenoid valve for bypass 20. Consequently, the operation mode changes to the cooling mode.

After opening the solenoid valve 20, the controller 32 starts the compressor 2, and adjusts the control of the number of revolution Nc of the compressor into the proper control state in the cooling mode. Furthermore, the controller adjusts the valve position of the outdoor expansion valve 6 into a fully open state. Also in this way, when the controller opens the solenoid valve 20 in the case of changing from the heating mode/the dehumidifying and heating mode to the cooling mode, the refrigerant does not rapidly flow into the outdoor heat exchanger 7, and at the changing time from the heating mode/the dehumidifying and heating mode to the cooling mode, it is possible to eliminate or decrease the noise generated when the solenoid valve for bypass 20 opens.

Especially, also according to this example, in the noise improvement control, the controller 32 stops the compressor 2, and hence it is possible to further rapidly decrease the radiator pressure PCI and the pressure difference before and after the solenoid valve 20. It is to be noted that also in this example as described above, on the basis of the pressure difference ΔPbp before and after the solenoid valve 20 (the radiator pressure PCI−the outdoor heat exchanger pressure PXO), the controller may open the solenoid valve 20 when the pressure difference ΔPbp decreases to the predetermined value or less.

(20) Noise Improvement Control (No. 16)

Next, there will be described a further example of the noise improvement control to be executed by the controller 32 when the heating mode/the dehumidifying and heating mode changes to the cooling mode, with reference to FIG. 21. In the noise improvement control of this example, the controller 32 changes the predetermined value of the radiator pressure PCI and the predetermined value of the pressure difference ΔPbp in the noise improvement control of the above-mentioned respective control examples (Embodiment 2) and the predetermined value of the subcool degree SC of the refrigerant of the radiator 4, in accordance with the velocity.

Figure 21:
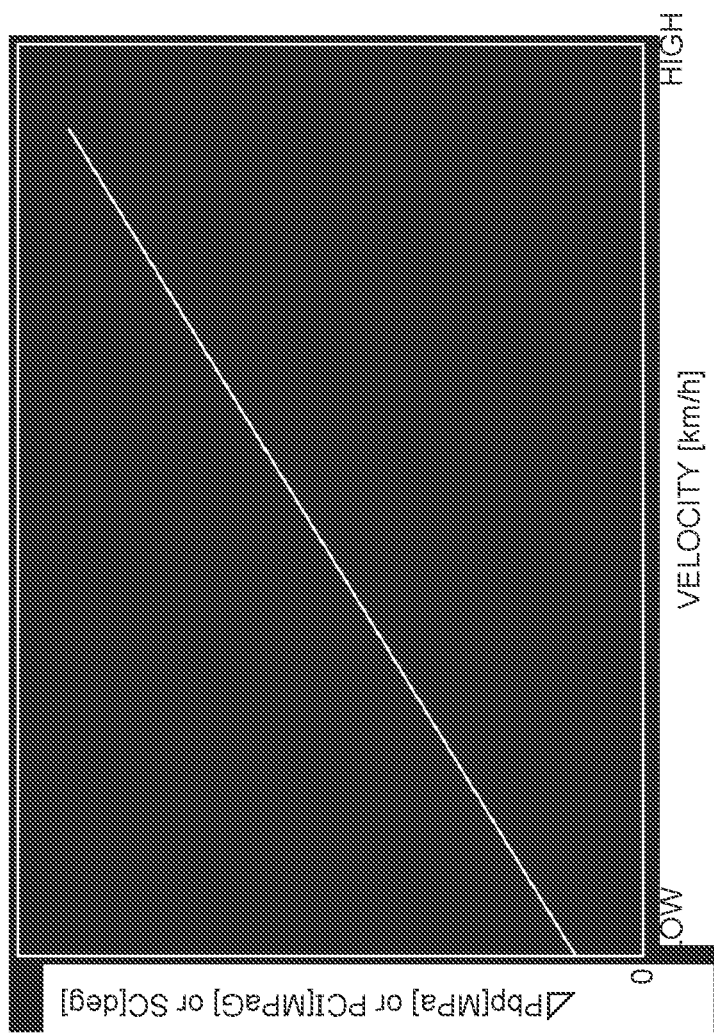
FIG. 21 is a diagram showing a relation between a velocity and a radiator pressure or the like in further noise improvement control.

In this case, as the velocity is higher, the controller 32 increases the above predetermined value of the radiator pressure PCI, or the predetermined value of the pressure difference ΔPbp before and after the solenoid valve 20, or the predetermined value of the subcool degree SC of the radiator 4 in a linear functional manner as shown in FIG. 21 in the example. Here, as the velocity is higher, the amount of the outdoor air flowing into the outdoor heat exchanger 7 increases, and the outdoor heat exchanger pressure PXO increases, and hence it is possible to eliminate or decrease the noise even when increasing the predetermined value of the radiator pressure PCI, or the predetermined value of the pressure difference ΔPbp before and after the solenoid valve 20, or the predetermined value of the subcool degree SC of the radiator 4. Consequently, it is possible to open the solenoid valve 20 earlier and rapidly change to the cooling mode.

It is to be noted that in this example, the above respective predetermined values increase in the linear functional manner in accordance with the increase of the velocity, but the present invention is not limited to this example, and in a case where the velocity is not less than the predetermined value, the controller may increase each predetermined value higher than in a case where the velocity is low.

(21) Noise Improvement Control (No. 17)

Next, there will be described a still further example of the noise improvement control to be executed by the controller 32 when the heating mode/the dehumidifying and heating mode changes to the cooling mode, with reference to FIG. 22. In the noise improvement control of this example, the controller 32 changes the predetermined value of the radiator pressure PCI and the predetermined value of the pressure difference ΔPbp in the noise improvement control of the above-mentioned respective control examples (Embodiment 2), and the predetermined value of the subcool degree SC of the refrigerant of the radiator 4, in accordance with the air volume of the indoor blower 27.

Figure 22:
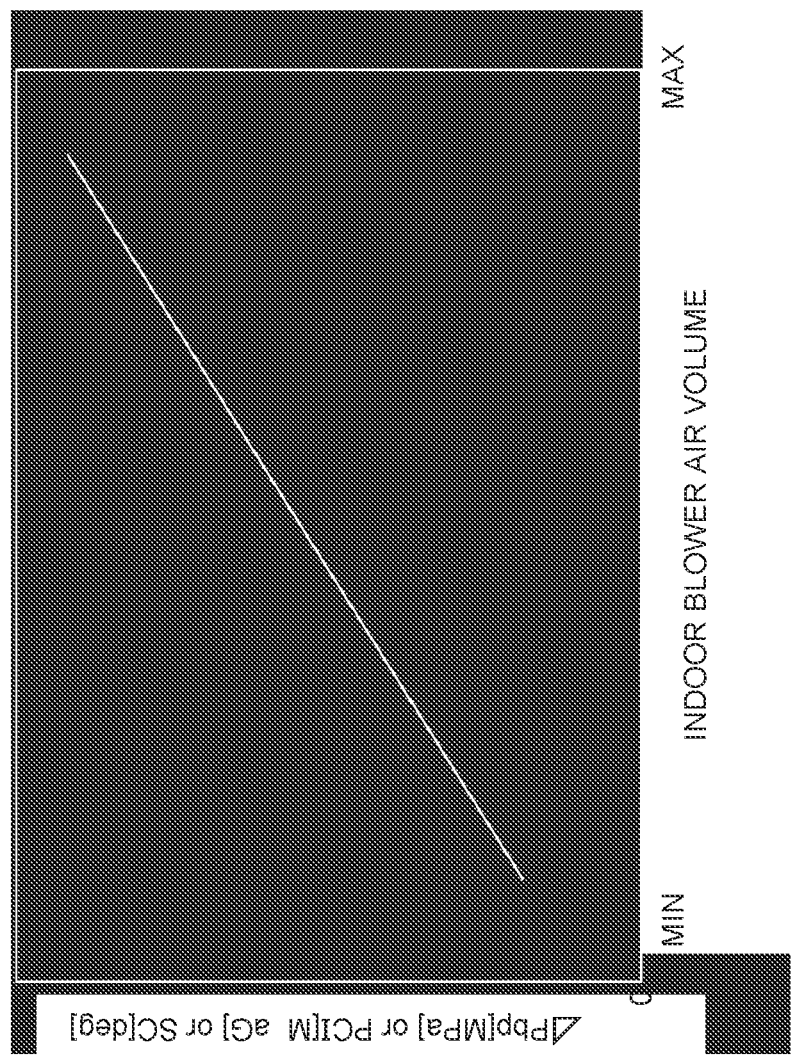
FIG. 22 is a diagram showing a relation between an indoor blower air volume and the radiator pressure or the like in still further noise improvement control.

In this case, as the air volume of the indoor blower 27 decreases (from MAX to MIN), the controller 32 decreases the above predetermined value of the radiator pressure PCI, or the predetermined value of the pressure difference ΔPbp before and after the solenoid valve 20, or the predetermined value of the subcool degree SC of the radiator 4 in a linear functional manner as shown in FIG. 22 in the example. Here, as the air volume of the indoor blower 27 decreases, the radiator pressure PCI increases, and hence the controller decreases the predetermined value of the radiator pressure PCI, or the predetermined value of the pressure difference ΔPbp before and after the solenoid valve 20, or the predetermined value of the subcool degree SC of the radiator 4, so that in a situation where the radiator pressure PCI increases, it is possible to more securely eliminate or decrease the generation of the noise.

Embodiment 3

It is to be noted that in the above respective embodiments, a controller does not have to execute noise improvement control in a case where a velocity is not less than a predetermined value and/or in a case where an air volume of an indoor blower 27 is not less than a predetermined value. That is, in a situation where the velocity is high and an amount of outdoor air flowing into an outdoor heat exchanger 7 increases to increase a pressure of the outdoor heat exchanger and/or in a situation where the air volume of the indoor blower 27 is large and a radiator pressure PCI does not increase, the device does not execute the noise improvement control. Consequently, it is possible to immediately open a solenoid valve 22 or a solenoid valve 20 and avoid both of generation of noise and delay of operation mode change.

Embodiment 4

(22) Noise Improvement Control (No. 18)

Figure 23:
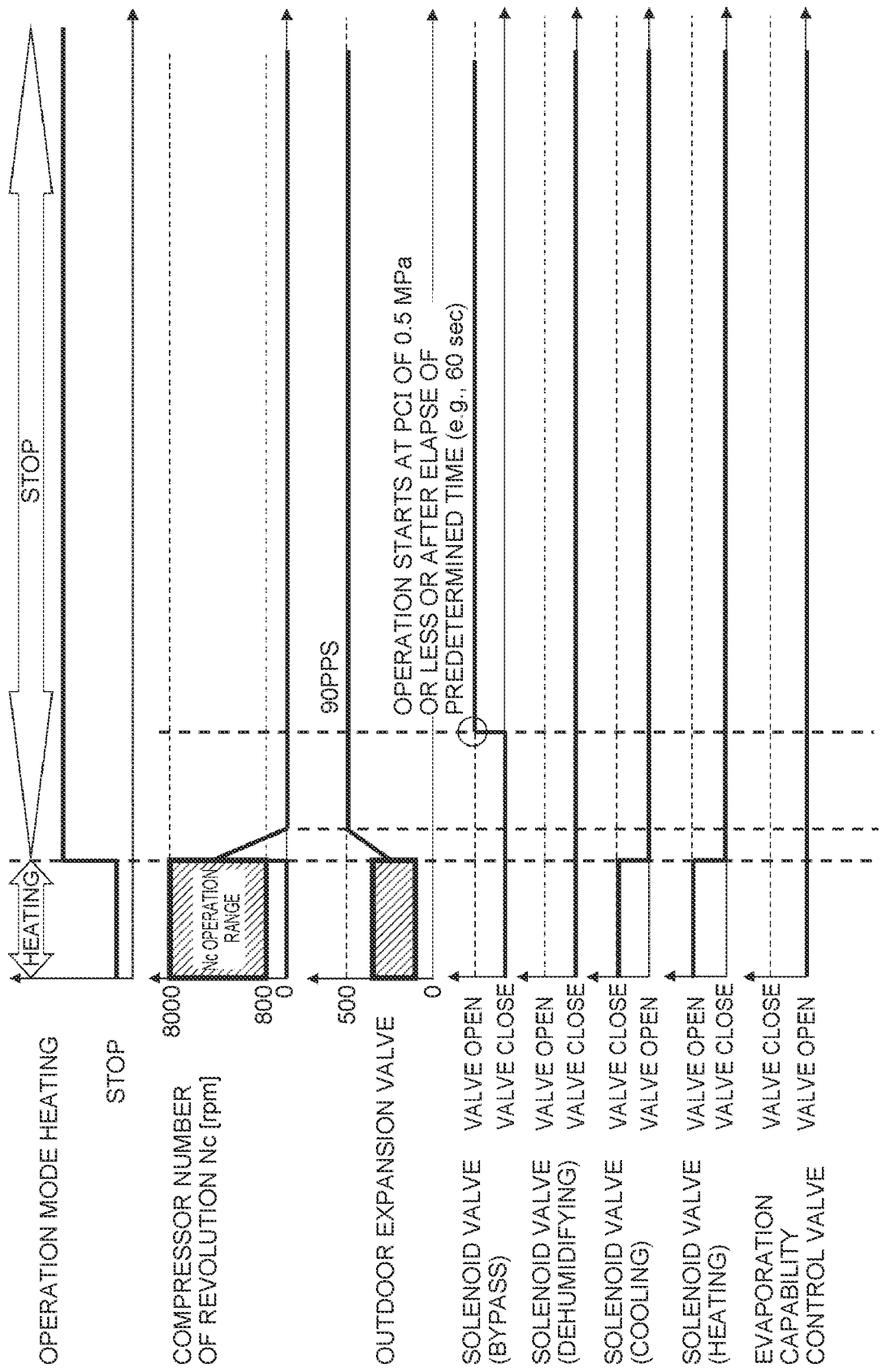
FIG. 23 is another timing chart of each apparatus explaining noise improvement control of a further embodiment which is to be executed by the controller of FIG. 2 (Embodiment 4)
Figure 24:
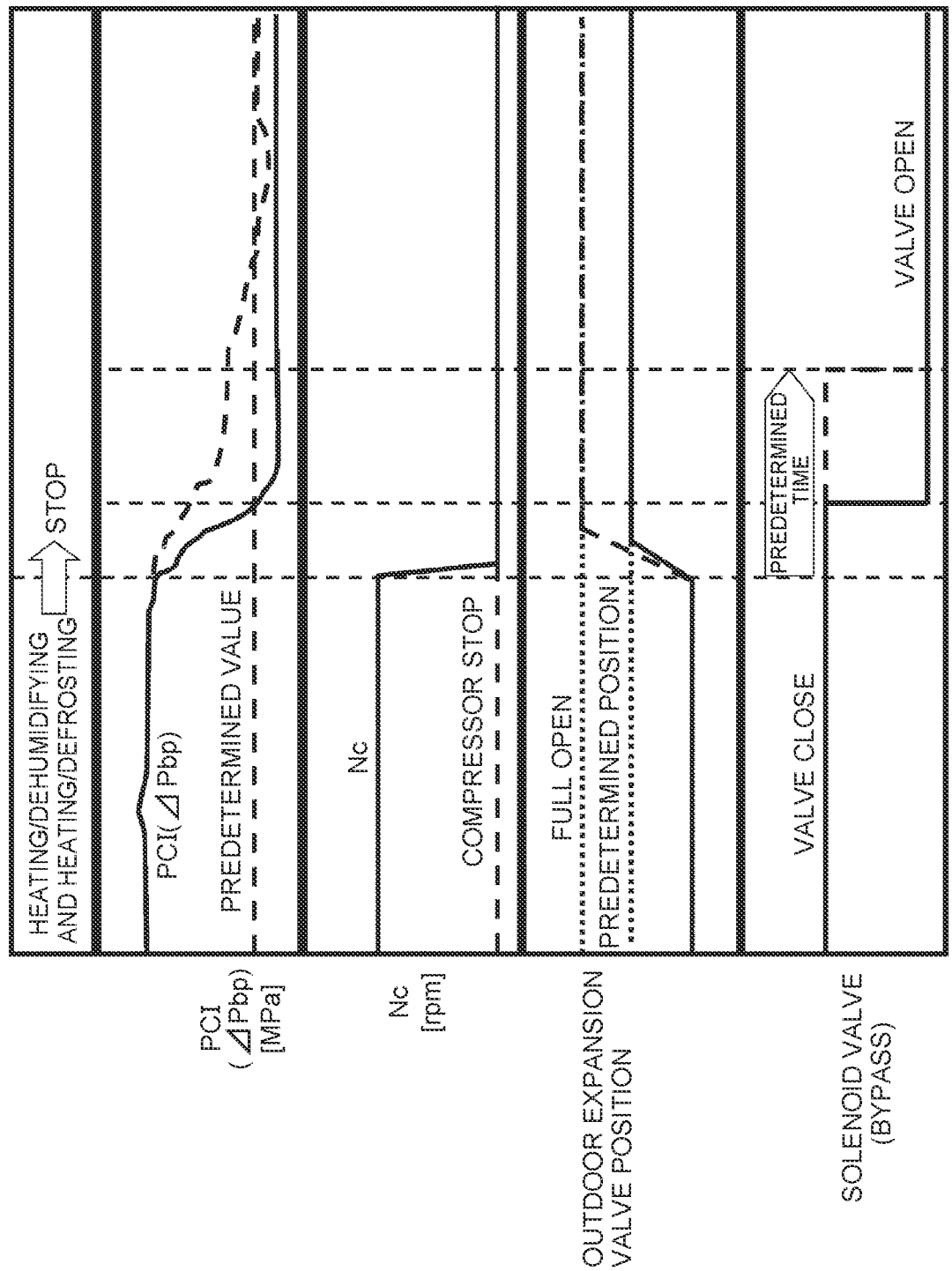
FIG. 24 is a timing chart explaining operations of a controller, an outdoor expansion valve and a solenoid valve for bypass in FIG. 23.

Next, there will be described a still further example of noise improvement control to be executed by a controller 32 when an operation of a vehicular air-conditioning device 1 stops from a heating mode/a dehumidifying and heating mode, with reference to FIG. 23 and FIG. 24. It is to be noted that the vehicular air-conditioning device also has a defrosting mode in which the controller 32 opens a solenoid valve 20 so that a high-temperature refrigerant flows into an outdoor heat exchanger 7, and removes frosting of the outdoor heat exchanger 7, but also when the operation stops from this defrosting mode, the vehicular air-conditioning device executes the noise improvement control mentioned below.

In this case, when the controller 32 stops the operation from the heating mode/the dehumidifying and heating mode/ the defrosting mode (a compressor 2 stops), the controller fully opens a valve position of an outdoor expansion valve 6 (an upper limit of controlling) or enlarges the valve position to a predetermined position. Consequently, a radiator pressure PCI decreases, but the controller keeps the solenoid valve for bypass 20 to be closed until the radiator pressure PCI decreases to a predetermined value (e.g., 0.5 MPa or the like) or less or predetermined time (e.g., from 30 seconds to 60 seconds or the like) elapses from the stop of the compressor 2 (energization). Further, after satisfying these conditions, the controller adjusts the solenoid valve 20 to be non-energized, and opens the valve.

In this way, when the controller 32 stops the operation from the heating mode, the dehumidifying and heating mode, or the defrosting mode to defrost the outdoor heat exchanger 7, the controller enlarges the valve position of the outdoor expansion valve 6 and keeps the solenoid valve 20 to be closed until the radiator pressure PCI decreases to the predetermined value or less or until the predetermined time elapses from the stop of the compressor 2, thereby making it possible to eliminate or inhibit noise generated when the solenoid valve for bypass 20 opens at the stop time.

It is to be noted that in this embodiment, the valve position of the outdoor expansion valve 6 enlarges, but the present invention is not limited to this embodiment, and is also effective in a case where without enlarging the valve position of the outdoor expansion valve, the solenoid valve 20 is kept to be closed (energized) until the radiator pressure PCI decreases to the predetermined value or the predetermined time elapses from the stop of the compressor 2.

Embodiment 5

Figure 25:
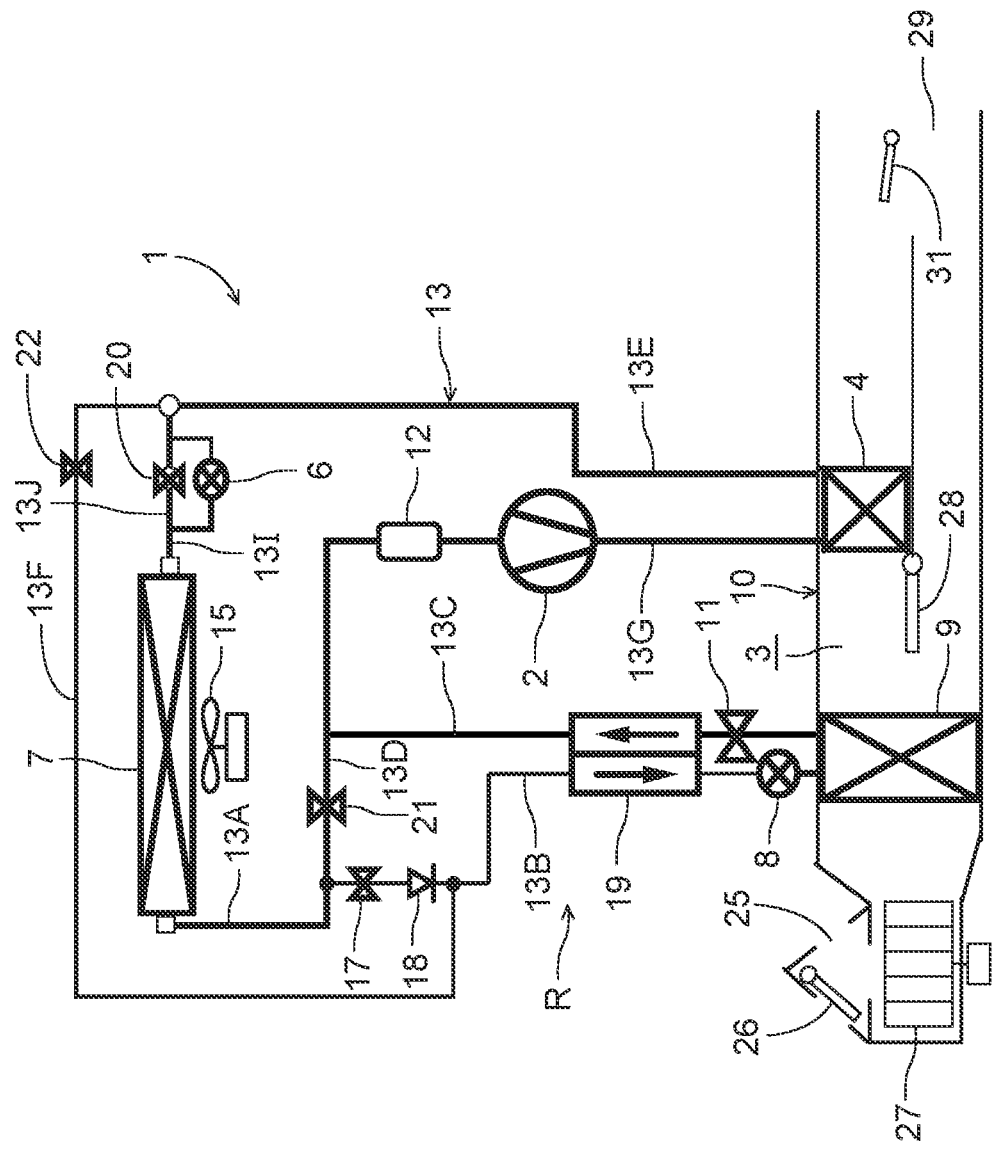
FIG. 25 is a constitutional view of a vehicular air-conditioning device of a still further embodiment to which the present invention is applicable (Embodiment 5).

Next, FIG. 25 shows another constitutional view of a vehicular air-conditioning device 1 of the present invention. In this embodiment, an outdoor heat exchanger 7 does not include a receiver drier portion 14 and a subcooling portion 16, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is similarly connected to a refrigerant pipe 13C on a downstream side of an internal heat exchanger 19 via a solenoid valve 21.

The other constitution is similar to the example of FIG. 1. In this way, the present invention is also effective for the vehicular air-conditioning device 1 of a refrigerant circuit R employing the outdoor heat exchanger 7 which does not have the receiver drier portion 14 and the subcooling portion 16.

Additionally, needless to say, the constitution and respective numeric values of the refrigerant circuit R described in the above respective embodiments are not limited to the embodiments, and are changeable without departing from the gist of the present invention.

DESCRIPTION OF REFERENCE NUMERALS

1: vehicular air-conditioning device
2: compressor
3: air flow passage
4: radiator
6: outdoor expansion valve
7: outdoor heat exchanger
8: indoor expansion valve
9: heat absorber
11: evaporation capability control valve
17, 20, 21 and 22: solenoid valve (an opening/closing valve)
26: suction changing damper
27: indoor blower (a blower fan)
28: air mix damper
30: circulating pump (circulating means)
32: controller (control means)
R: refrigerant circuit

The invention claimed is:

1. A vehicular air-conditioning device comprising:
a compressor which compresses a refrigerant;
an air flow passage through which air to be supplied to a vehicle interior flows;
a radiator which lets the refrigerant radiate heat to heat the air to be supplied from the air flow passage to the vehicle interior;
a heat absorber which lets the refrigerant absorb heat to cool the air to be supplied from air flow passage to the vehicle interior;
an outdoor heat exchanger disposed outside the vehicle interior to let the refrigerant radiate or absorb heat;
an outdoor expansion valve configured to decompress the refrigerant flowing into the outdoor heat exchanger,
an indoor expansion valve configured to decompress the refrigerant flowing into the heat absorber,
a valve that opens and closes for dehumidifying which is connected in parallel with the outdoor heat exchanger; and
a controller,
the vehicular air-conditioning device changing and executing at least:
a heating mode in which the controller lets a portion of the refrigerant that is discharged from the compressor radiate heat in the radiator, decompresses, by the outdoor expansion valve, the portion of the refrigerant by which heat has been radiated, and then lets the portion of the refrigerant absorb heat in the outdoor heat exchanger, and
a dehumidifying and heating mode in which the controller opens the valve that opens and closes, decompresses at least a part of the refrigerant flowing out from the radiator by the indoor expansion valve and then lets the part of the refrigerant absorb heat in the heat absorber, and decompresses a remaining refrigerant by which heat has been radiated and then lets the remaining refrigerant absorb heat in the outdoor heat exchanger,
wherein when the heating mode changes to the dehumidifying and heating mode, the controller executes noise improvement control to decrease a pressure of the radiator or a pressure difference before and after the valve that opens and closes to a predetermined value or less by decreasing a number of revolutions of the compressor and enlarging a valve opening of the outdoor expansion valve and then opening the valve that opens and closes.

2. The vehicular air-conditioning device according to claim 1,
wherein the controller stops the compressor in the noise improvement control.

3. The vehicular air-conditioning device according to claim 2, comprising:
an indoor blower to supply the air to the air flow passage,
wherein as an air volume of the indoor blower decreases, the controller decreases a predetermined value of the pressure of the radiator, a predetermined value of the pressure difference before and after the opening/closing valve, or a predetermined value of a subcool degree of the refrigerant of the radiator.

4. The vehicular air-conditioning device according to claim 1, comprising:
an indoor blower to supply the air to the air flow passage,
wherein the controller does not execute the noise improvement control in a case where a velocity is a predetermined value or more and/or in a case where an air volume of the indoor blower is a predetermined value or more.

5. A vehicular air-conditioning device comprising:
a compressor which compresses a refrigerant;
an air flow passage through which air to be supplied to a vehicle interior flows;

a radiator which lets the refrigerant radiate heat to heat the air to be supplied from the air flow passage to the vehicle interior;

a heat absorber which lets the refrigerant absorb heat to cool the air to be supplied from the air flow passage to the vehicle interior;

an outdoor heat exchanger disposed outside the vehicle interior to let the refrigerant radiate or absorb heat;

an outdoor expansion valve to decompress the refrigerant flowing into the outdoor heat exchanger;

an indoor expansion valve configured to decompress the refrigerant flowing into the heat absorber, an valve that opens and closes for bypass which is connected in parallel with the outdoor expansion valve; and a controller, the vehicular air-conditioning device changing and executing at least:

a heating mode in which the controller lets a portion of the refrigerant that is discharged from the compressor radiate heat in the radiator, decompresses, by the outdoor expansion valve, the portion of the refrigerant by which heat has been radiated, and then lets the portion of the refrigerant absorb heat in the outdoor heat exchanger, a dehumidifying and heating mode in which the controller decompresses at least a part of the refrigerant flowing out from the radiator by the indoor expansion valve, and then lets the part of refrigerant absorb heat in the heat absorber, and decompresses a remaining refrigerant by which heat has been radiated and then lets the remaining refrigerant absorb heat in the outdoor heat exchanger, and a cooling mode in which the controller opens the valve that opens and closes, lets the portion of the refrigerant discharged from the compressor radiate heat in the outdoor heat exchanger, decompresses the portion of the refrigerant by which heat has been radiated, and then lets the portion of the refrigerant absorb heat in the heat absorber, wherein when the heating mode or the dehumidifying and heating mode changes to the cooling mode, the controller executes noise improvement control to decrease a pressure of the radiator or a pressure difference before and after the valve that opens and closes to a predetermined value or less by decreasing a number of revolutions of the compressor and enlarging a valve opening of the outdoor expansion valve and then opening the valve that opens and closes.

6. The vehicular air-conditioning device according to claim 5, wherein as a velocity is higher, the controller increases a predetermined value of the pressure of the radiator, a predetermined value of the pressure difference before and after the opening/closing valve, or a predetermined value of a subcool degree of the refrigerant of the radiator.

7. The vehicular air-conditioning device according to claim 5, comprising:

an indoor blower to supply the air to the air flow passage, wherein the controller does not execute the noise improvement control in a case where a velocity is a predetermined value or more and/or in a case where an air volume of the indoor blower is a predetermined value or more.

8. The vehicular air-conditioning device according to claim 5, wherein the opening/closing valve is a solenoid valve which opens in a non-energized state, and in a case of stopping from the heating mode, the dehumidifying and heating mode or a defrosting mode to defrost the outdoor heat exchanger, the controller enlarges a valve position of the outdoor expansion valve or closes the opening/closing valve until the pressure of the radiator decreases to the predetermined value or less or until predetermined time elapses from stop of the compressor.

9. The vehicular air-conditioning device according to claim 8, comprising:

an indoor blower to supply the air to the air flow passage; and an outdoor blower to blow outdoor air through the outdoor heat exchanger, wherein the controller increases an air volume of the indoor blower and/or the outdoor blower immediately before opening the opening/closing valve.

10. The vehicular air-conditioning device according to claim 8, comprising:

an indoor blower to supply the air to the air flow passage; and an outdoor blower to blow outdoor air through the outdoor heat exchanger, wherein the controller increases an air volume of the indoor blower and/or the outdoor blower immediately before opening the opening/closing valve.

11. The vehicular air-conditioning device according to claim 5, comprising:

an indoor blower to supply the air to the air flow passage; and an outdoor blower to blow outdoor air through the outdoor heat exchanger, wherein the controller increases an air volume of the indoor blower and/or the outdoor blower immediately before opening the opening/closing valve.

12. The vehicular air-conditioning device according to claim 11, wherein as a velocity is higher, the controller increases a predetermined value of the pressure of the radiator, a predetermined value of the pressure difference before and after the opening/closing valve, or a predetermined value of a subcool degree of the refrigerant of the radiator.

13. A vehicular air-conditioning device comprising:

a compressor which compresses a refrigerant;

an airflow passage through which air to be supplied to a vehicle interior flows;

a radiator which lets the refrigerant radiate heat to heat the air to be supplied from the air flow passage to the vehicle interior;

a heat absorber which lets the refrigerant absorb heat to cool the air to be supplied from the air flow passage to the vehicle interior;

an outdoor heat exchanger disposed outside the vehicle interior to let the refrigerant radiate or absorb heat;

an outdoor expansion valve to decompress the refrigerant flowing into the outdoor heat exchanger, an indoor expansion valve configured to decompress the refrigerant flowing into the heat absorber, a valve that opens and closes for dehumidifying which is connected in parallel with the outdoor heat exchanger; and a controller, the vehicular air-conditioning device changing and executing at least:

a heating mode in which the controller lets a portion of the refrigerant that is discharged from the compressor radiate heat in the radiator, decompresses the portion of the refrigerant by which heat has been radiated, and then lets the portion of the refrigerant absorb heat in the outdoor heat exchanger, and a dehumidifying and heating mode in which the controller opens the valve that opens and closes, decompresses at least a part of the refrigerant flowing out from the radiator by the indoor expansion valve and then lets the part of the refrigerant absorb heat in the heat absorber, and decompresses a remaining refrigerant by which heat has been radiated and then lets the remaining refrigerant absorb heat in the outdoor heat exchanger, wherein when the heating mode changes to the dehumidifying and heating mode, the controller executes noise improvement control, wherein in the noise improvement control, the controller decreases a number of revolution of the compressor, also controls a valve position of the outdoor expansion valve so that a subcool degree of the refrigerant of the radiator becomes a predetermined value or less, and opens the opening/closing valve after the pressure of the radiator, the pressure difference before and after the opening/closing valve or the subcool degree decreases to the predetermined value or less.

14. The vehicular air-conditioning device according to claim 13, wherein as a velocity is higher, the controller increases the predetermined value of the pressure of the radiator, the predetermined value of the pressure difference before and after the opening/closing valve, or the predetermined value of the subcool degree of the refrigerant of the radiator.

15. The vehicular air-conditioning device according to claim 14, wherein the controller stops the compressor in the noise improvement control.

16. The vehicular air-conditioning device according to claim 13, comprising:

an indoor blower to supply the air to the air flow passage, wherein as an air volume of the indoor blower decreases, the controller decreases the predetermined value of the pressure of the radiator, the predetermined value of the pressure difference before and after the opening/closing valve, or the predetermined value of the subcool degree of the refrigerant of the radiator.

17. The vehicular air-conditioning device according to claim 16, comprising:

wherein the controller does not execute the noise improvement control in a case where a velocity is a predetermined value or more and/or in a case where an air volume of the indoor blower is a predetermined value or more.

18. A vehicular air-conditioning device comprising:

a compressor which compresses a refrigerant;

an air flow passage through which air to be supplied to a vehicle interior flows;

a radiator which lets the refrigerant radiate heat to heat the air to be supplied from the air flow passage to the vehicle interior;

a heat absorber which lets the refrigerant absorb heat to cool the air to be supplied from the air flow passage to the vehicle interior;

an outdoor heat exchanger disposed outside the vehicle interior to let the refrigerant radiate or absorb heat;

an outdoor expansion valve to decompress the refrigerant flowing into the outdoor heat exchanger;

an indoor expansion valve configured to decompress the refrigerant flowing into the heat absorber, an opening/closing valve for bypass which is connected in parallel with the outdoor expansion valve, parallel with the outdoor heat exchanger; and a controller, the vehicular air-conditioning device changing and executing at least:

a heating mode in which the controller lets a portion of the refrigerant that is discharged from the compressor radiate heat in the radiator, decompresses the portion of the refrigerant by which heat has been radiated, and then lets the portion of the refrigerant absorb heat in the outdoor heat exchanger, and a dehumidifying and heating mode in which the controller opens the opening/closing valve, decompresses at least a part of the refrigerant flowing out from the radiator by the indoor expansion valve and then lets the part of the refrigerant absorb heat in the heat absorber, and decompresses a remaining refrigerant by which heat has been radiated and then lets the remaining refrigerant absorb heat in the outdoor heat exchanger, wherein when the heating mode changes to the dehumidifying and heating mode, the controller executes noise improvement control to decrease a pressure of the radiator or a pressure difference before and after the opening/closing valve to a predetermined value or less and then to open the opening/closing valve, wherein in the noise improvement control, the controller decreases a number of revolution of the compressor, enlarges a valve position of the outdoor expansion valve and then opens the opening/closing valve for bypass, and opens the opening/closing valve for dehumidifying after the pressure of the radiator or the pressure difference before and after the opening/closing valve for dehumidifying decreases to the predetermined value or less.

* * * * *